(12) United States Patent
Jiang et al.

(10) Patent No.: US 12,483,069 B2
(45) Date of Patent: Nov. 25, 2025

(54) DYNAMIC WIRELESS POWER SUPPLY SYSTEM WITH CONTROLLABLE POWER CAPACITY USING ENERGY MANAGEMENT CIRCUITS

(71) Applicant: Huawei Digital Power Technologies Co., Ltd., Shenzhen (CN)

(72) Inventors: Jinhai Jiang, Harbin (CN); Lianbin Cheng, Harbin (CN); Xingjian Zhou, Harbin (CN); Kai Song, Harbin (CN); Chunbo Zhu, Harbin (CN); Zhixian Wu, Dongguan (CN); Shuyang Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/591,648

(22) Filed: Feb. 29, 2024

(65) Prior Publication Data

US 2024/0235270 A1  Jul. 11, 2024

Related U.S. Application Data

(63) Continuation of application No. PCT/CN2022/110641, filed on Aug. 5, 2022.

(30) Foreign Application Priority Data

Aug. 31, 2021 (CN) .......................... 202111013681.1

(51) Int. Cl.
*H02J 50/00* (2016.01)
*H02J 50/12* (2016.01)
(Continued)

(52) U.S. Cl.
CPC ........... *H02J 50/12* (2016.02); *H02M 1/0043* (2021.05); *B60L 53/122* (2019.02); *B60L 2210/30* (2013.01)

(58) Field of Classification Search
None
See application file for complete search history.

(56) References Cited

U.S. PATENT DOCUMENTS 7,564,703 B1 * 7/2009 Braun ................... H02M 7/493
363/39
2014/0232197 A1  8/2014 Keeling et al.
(Continued)

FOREIGN PATENT DOCUMENTS

CN  104981970 A  10/2015
CN  108808887 A  11/2018
(Continued)

OTHER PUBLICATIONS

Zhixia Zhang et al, "Power Electronic Technology," China water and power press, Jun. 30, 2014, with English translation total 10 pages.

Primary Examiner — Adi Amrany
(74) Attorney, Agent, or Firm — Conley Rose, P.C.

(57) ABSTRACT

A transmitter end includes a transmitter coil. The transmitter end further includes a transmitter end control system and N energy management modules, where N is an integer greater than 1. Input ends of the N energy management modules are electrically connected to a power grid, and output ends of the N energy management modules are electrically connected to the transmitter coil. Each energy management module includes an AC-DC circuit, an inverter circuit, and a transformer. The transmitter end control system is electrically connected to the inverter circuits in the N energy management modules, and is configured to output synchronous phase shift control signals with a fixed duty cycle, to drive the inverter circuits to work synchronously. The energy management module may be used in the transmitter end, and form a smallest module.

20 Claims, 24 Drawing Sheets

(51) Int. Cl.
*H02M 1/00* (2006.01)
*B60L 53/122* (2019.01)

(56) References Cited

U.S. PATENT DOCUMENTS

| | | | | |
|---|---|---|---|---|
| 2014/0346861 | A1* | 11/2014 | Achihara | H02M 7/537 |
| | | | | 307/9.1 |
| 2015/0214868 | A1* | 7/2015 | Choi | H02H 7/085 |
| | | | | 318/400.09 |
| 2017/0141698 | A1* | 5/2017 | Nikolov | H02M 1/0845 |
| 2017/0368944 | A1 | 12/2017 | Huang et al. | |
| 2018/0166915 | A1 | 6/2018 | Afridi et al. | |
| 2021/0135498 | A1* | 5/2021 | Wu | H02M 1/0058 |
| 2021/0226569 | A1* | 7/2021 | Miyamori | H02P 25/184 |
| 2022/0131492 | A1* | 4/2022 | Takayama | H02K 1/148 |
| 2022/0340024 | A1* | 10/2022 | Chen | B60L 53/62 |

FOREIGN PATENT DOCUMENTS

| | | | |
|---|---|---|---|
| CN | 110808625 A | | 2/2020 |
| CN | 112491157 A | | 3/2021 |
| CN | 117375262 A | * | 1/2024 |
| WO | 2020211056 A1 | | 10/2020 |

* cited by examiner

DYNAMIC WIRELESS POWER SUPPLY SYSTEM WITH CONTROLLABLE POWER CAPACITY USING ENERGY MANAGEMENT CIRCUITS

CROSS-REFERENCE TO RELATED APPLICATIONS

This is a continuation of International Patent Application No. PCT/CN2022/110641 filed on Aug. 5, 2022, which claims priority to Chinese Patent Application No. 202111013681.1 filed on Aug. 31, 2021. The disclosures of the aforementioned applications are hereby incorporated by reference in their entireties.

TECHNICAL FIELD

This application relates to the field of wireless power supply technologies, and in particular, to a transmitter end, a receiver end, a dynamic wireless power supply system, and an electric vehicle.

BACKGROUND

As new energy vehicles, electric vehicles have attracted wide attention from all industries. Currently, a method for charging a battery of an electric vehicle includes wireless charging. In wireless charging, electric energy is transferred by using coupled electromagnetic fields as a medium. To further prolong use time of the electric vehicle and reduce a weight of a battery carried by the electric vehicle, a concept of dynamic wireless charging is proposed. That is, the electric vehicle is charged in a traveling process, and is charged while traveling.

The following describes a working principle of a dynamic wireless power supply system with reference to FIG. 1. FIG. 1 is a schematic diagram of the dynamic wireless power supply system. The dynamic wireless power supply system includes a primary side system (a ground part) and a secondary side system (a vehicle-mounted part). In the dynamic wireless power supply system, the primary side system usually needs to convert a power frequency alternating current into a high frequency alternating current, to implement high frequency alternating current resonance, and transfer electric energy to the secondary side system through magnetic coupling. However, in a high power application, the foregoing dynamic wireless power supply system usually uses a power diode as a rectifier component, and uses a metal-oxide-semiconductor field-effect transistor (MOSFET) or an insulated-gate bipolar transistor (IGBT) as a switching component. Due to a limitation of an existing manufacturing technology, the foregoing switching components cannot efficiently output energy at a high-power capacity. In addition, when a load side requires a different power level, design selection needs to be performed again for a primary side system. Consequently, it is difficult to implement compatibility and effective control of power capacities. In addition, when a load side of a secondary side system has a specific circuit parameter requirement, an additional circuit is required on a power grid side to implement voltage and current increase/decrease and dividing. A single-module cascade scheme usually cannot flexibly adjust voltage and current outputs, and an output voltage and an output current of a transmitter coil in the primary side system are less adjustable.

SUMMARY

In view of this, this application provides a transmitter end and a receiver end for dynamic wireless power supply, a dynamic wireless power supply system, and an electric vehicle. The dynamic wireless power supply system may add or remove an energy management module based on different power requirement levels, to quickly and flexibly increase a power capacity of the dynamic wireless power supply system.

According to a first aspect, an embodiment of this application provides a transmitter end, and the transmitter end includes a transmitter coil. The transmitter end further includes a transmitter end control system and N energy management modules, where N is an integer greater than 1. Input ends of the N energy management modules are electrically connected to a power grid, and output ends of the N energy management modules are electrically connected to the transmitter coil. Each energy management module includes an alternating current-direct current (AC-DC) circuit, an inverter circuit, and a transformer. An input end of the AC-DC circuit is electrically connected to the power grid. An output end of the AC-DC circuit is electrically connected to the inverter circuit. A primary coil of the transformer is electrically connected to the inverter circuit, and a secondary coil of the transformer is electrically connected to the transmitter coil. The transmitter end control system is electrically connected to the inverter circuits in the N energy management modules, and is configured to output synchronous phase shift control signals with a fixed duty cycle, to drive the inverter circuits to work synchronously.

In the first aspect of this application, the energy management module may be used in the transmitter end, and may form a smallest module of the transmitter end. In this way, the transmitter end may increase or decrease a quantity of energy management modules based on different power requirement levels, to quickly and flexibly increase a power capacity of a dynamic wireless power supply system and improve a system response speed. In addition, the AC-DC circuit and the inverter circuit are disposed to form an AC-DC-AC circuit, so as to implement alternating current-direct current-alternating current conversion of electric energy, thereby balancing and controlling synchronous power transmission and modulation of the dynamic wireless power supply system in a multi-module condition. In addition, the energy management module of the smallest module further includes the transformer, to implement independent decoupling, eliminate a circulating current, implement power isolation and integration, and effectively improve an overall power capacity of the transmitter end, so as to resolve a problem that decoupling cannot be implemented, and a circulating current and a current backflow easily occur in the conventional technology. In addition, disposing the transformer can implement an orderly ratio of a coil voltage and a coil current under synchronous modulation, to meet a specific power requirement.

In a possible design, the N energy management modules are electrically connected in series and/or in parallel. In this design, a connection relationship between the N energy management modules is not limited, and the N energy management modules may be connected in series, in parallel, or in series-parallel. This is flexible and has high applicability.

In a possible design, the inverter circuit includes switching transistors, the switching transistors form a full-bridge inverter circuit, and the AC-DC circuit is an uncontrolled rectifier circuit. The switching transistors are all configured to receive the phase shift control signals. In this design, each energy management module uses an uncontrolled rectifier and a full-bridge inverter to implement alternating current-direct current-alternating current conversion of electric energy, thereby balancing and controlling synchronous power transmission and modulation of the dynamic wireless power supply system in a multi-module condition. In addition, in this design, when a plurality of (for example, N, where N is an integer greater than 1) energy management modules are disposed, the plurality of energy management modules may be connected in series-parallel, to effectively share a power requirement required by a load side, reduce a current stress borne by a switching device (for example, a switching transistor) in a circuit, and increase an upper threshold of an input current.

In a possible design, the transmitter end further includes a compensation network, and the compensation network is electrically connected between the output ends of the N energy management modules and the transmitter coil. In this design, the compensation network may be an S compensation network, a P compensation network, an LCL compensation network, an LCC compensation network, or the like. This is not specifically limited in this embodiment of this application.

In a possible design, the transmitter end control system includes a current sensor, a sampling circuit, a control unit, and a drive circuit. The current sensor is electrically connected to the transmitter coil, and the sampling circuit is electrically connected to the current sensor. The control unit is electrically connected to the sampling circuit. The drive circuit is electrically connected to the control unit, and is configured to: receive a drive signal and output the corresponding phase shift control signal to the inverter circuit. In this design, the N energy management modules may be controlled by a lumped control system, that is, controlled by a same control system (for example, the transmitter end control system), to ensure that switching transistors of circuits at all levels are driven at the same time, and eliminate power imbalance between the groups of circuits.

In a possible design, the control unit is further configured to determine, based on a received current signal, whether overcurrent occurs in the current signal. When the control unit determines that overcurrent occurs, the control unit is further configured to: generate an interrupt signal and output the interrupt signal to the drive circuit, to block an output. When the control unit determines that no overcurrent occurs, the control unit generates the drive signal and outputs the drive signal to the drive circuit. In this design, the N energy management modules may be controlled by a lumped control system, that is, controlled by a same control system (for example, the transmitter end control system), to ensure that switching transistors of circuits at all levels are driven at the same time, and eliminate power imbalance between the groups of circuits.

According to a second aspect, an embodiment of this application provides a receiver end. The receiver end includes a receiver coil. The receiver end further includes a receiver end control system and M energy management modules, where M is an integer greater than 1. Input ends of the M energy management modules are electrically connected to the receiver coil. Output ends of the M energy management modules are electrically connected to a load. Each energy management module includes an AC-DC circuit, an inverter circuit, and a transformer. An input end of the AC-DC circuit is electrically connected to the receiver coil, and an output end of the AC-DC circuit is electrically connected to the inverter circuit. A primary coil of the transformer is electrically connected to the inverter circuit, and a secondary coil of the transformer is electrically connected to the load. The receiver end control system is electrically connected to the inverter circuits in the M energy management modules, and is configured to output synchronous phase shift control signals with a fixed duty cycle, to drive the inverter circuits to work synchronously.

In a possible design, the N energy management modules are electrically connected in series and/or in parallel.

In a possible design, the inverter circuit includes switching transistors. The switching transistors form a full-bridge inverter circuit. The AC-DC circuit is an uncontrolled rectifier circuit. The switching transistors are all configured to receive the phase shift control signals.

In a possible design, the receiver end further includes a compensation network. The compensation network is electrically connected between the receiver coil and the M energy management modules.

In a possible design, the receiver end further includes an output rectifier circuit and an output filter circuit. One end of the output rectifier circuit is electrically connected to the output ends of the M energy management modules, and the other end is electrically connected to the load through the output filter circuit.

In a possible design, the receiver end control system includes a current sensor, a voltage sensor, a sampling circuit, a control unit, and a drive circuit. Both the current sensor and the voltage sensor are electrically connected to the load. The sampling circuit is electrically connected to the current sensor and the voltage sensor. The control unit is electrically connected to the sampling unit. The drive circuit is electrically connected to the control unit, and is configured to: receive a drive signal and output the corresponding phase shift control signal to the inverter circuit and the output rectifier circuit.

In a possible design, the control unit is further configured to determine, based on a received circuit signal, whether overcurrent and/or overvoltage occurs in the circuit signal. The circuit signal includes a current signal and a voltage signal. When the control unit determines that overcurrent and/or overvoltage occurs, the control unit is configured to: generate an interrupt signal and output the interrupt signal to the drive circuit, to block an output. When the control unit determines that no overcurrent or overvoltage occurs, the control unit is configured to: generate the drive signal and output the drive signal to the drive circuit.

According to a third aspect, an embodiment of this application provides a dynamic wireless power supply system. The dynamic wireless power supply system includes a transmitter end and a receiver end. The transmitter end is the transmitter end in the first aspect and the possible designs. The receiver end is the receiver end in the second aspect and the possible designs.

According to a fourth aspect, an embodiment of this application provides an electric vehicle. The electric vehicle includes a power battery pack. The electric vehicle further includes the receiver end in the second aspect and the possible designs. The receiver end is electrically connected to the power battery pack, and is configured to charge the power battery pack.

In addition, for technical effects brought by any possible design manner of the second aspect to the fourth aspect, refer to technical effects brought by different design manners related to the transmitter end. Details are not described herein again.

BRIEF DESCRIPTION OF DRAWINGS

To describe the technical solutions in embodiments of this application or in the technology more clearly, the following briefly introduces the accompanying drawings used in describing embodiments or the technology. It is clear that the accompanying drawings in the following descriptions show some embodiments of this application, and a person of ordinary skill in the art may still derive other drawings from these accompanying drawings without creative efforts.

DESCRIPTION OF MAIN COMPONENT SYMBOLS

Figure 1:
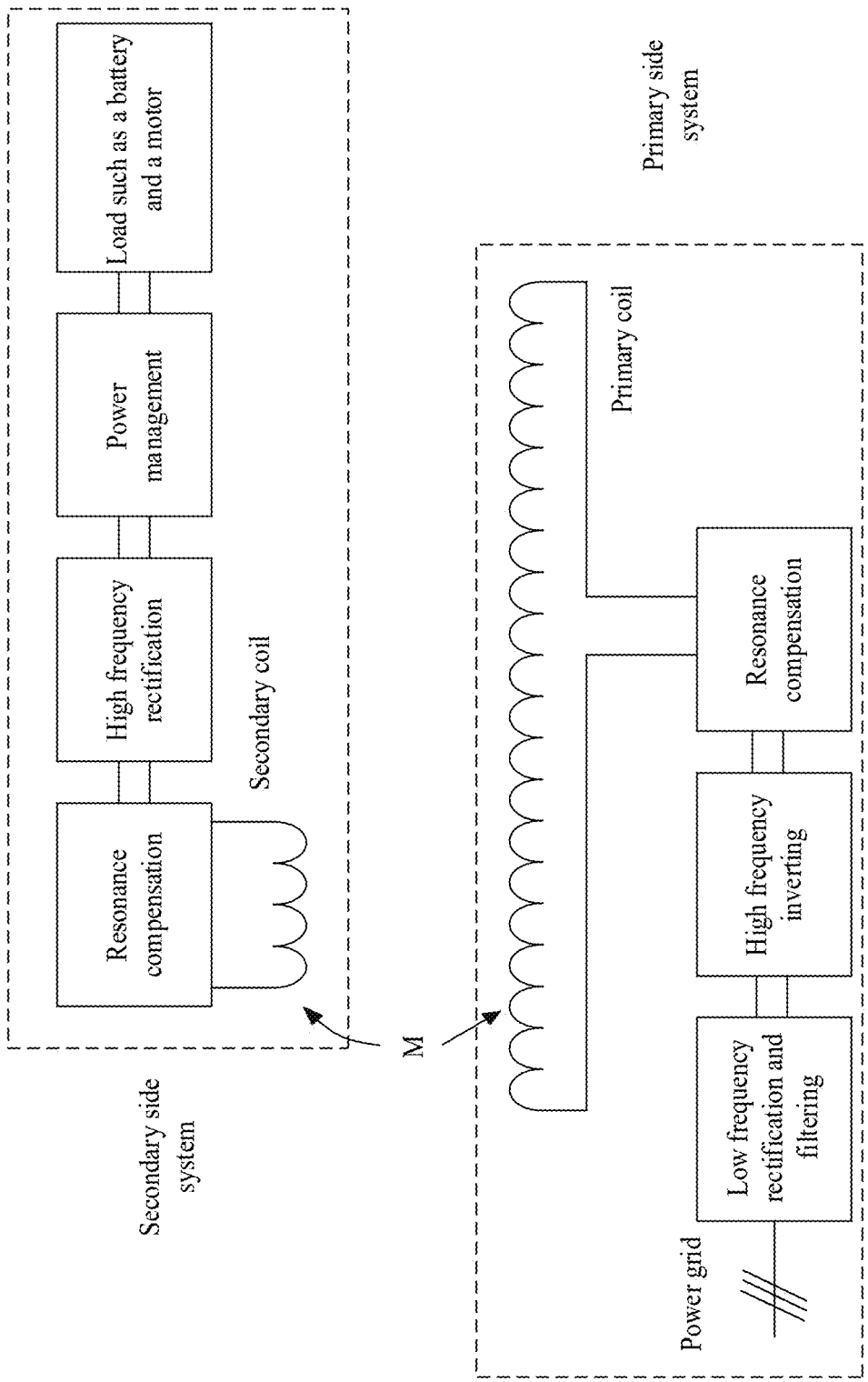
FIG. 1 is a schematic diagram of a dynamic wireless power supply system according to an embodiment of this application.

| | |
|---|---|
| Energy management module | 100, 100a, 100b, 100c, and 100d |
| AC-DC circuit | 11, 11a, 11b, 11c, and 11d |
| Inverter circuit | 12, 12a, 12b, 12c, and 12d |
| Transformer | 13, 13a, 13b, 13c, and 13d |
| Filter capacitor | C0 and C3 |
| First node | J1 |
| Second node | J2 |
| Diode | D1 to D4 |
| Switching transistor | $S_1$ to $S_4$, $S_{p1}$ to $S_{p4}$, and $S_{s1}$ to $S_{s6}$ |
| Transmitter end | 200, 200a, and 200c |
| Compensation network | 201, 301, 201c, and 301d |
| Inductor | L1 |
| Transmitter end control system | 203 and 203a |
| Current sensor | CSA and CSB |
| Voltage sensor | VS |
| Sampling circuit | 204 and 305 |
| Control unit | 205 and 306 |
| Drive circuit | 206 and 307 |
| Protection circuit | 207 |
| First compensation capacitor | C1 |
| Transmitter coil | Ct |
| Receiver end | 300, 300a, 300c, and 501 |
| Receiver coil | Cr |
| Magnetic coupling mechanism | M, M1, and M2 |
| Output rectifier circuit | 302, 302b, and 302d |
| Output filter circuit | 303 |
| Receiver end control system | 304 |
| Second compensation capacitor | C2 |
| Third compensation capacitor | C4 and C5 |
| Dynamic wireless power supply system | 400, 400a, and 400c |
| Energy management circuit | 401 |
| Electric vehicle | 500 |
| Power battery pack | 502 |

In the following specific implementations, this application is further described with reference to the accompanying drawings.

DESCRIPTION OF EMBODIMENTS

It should be understood that, in this application, unless otherwise specified, "/" means "or". For example, A/B may mean A or B. The term "and/or" in this application describes only an association relationship for describing associated objects and represents that three relationships may exist. For example, A and/or B may represent the following three cases: Only A exists, both A and B exist, and only B exists. "At least one" means one or more, and "a plurality of" means two or more.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In addition, terms such as "first" and "second" in this application are merely used for distinction and description, and cannot be understood as an indication or implication of relative importance or implicit indication of a quantity of indicated technical features, or an indication or implication of a sequence.

In this application, an "electrical connection" should be understood in a broad sense. For example, the "electrical connection" may be a physical direct connection, or may be an electrical connection implemented through an intermediate medium, that is, an indirect connection, for example, a connection implemented through a resistor, an inductor, or another electronic component.

Figure 2A:
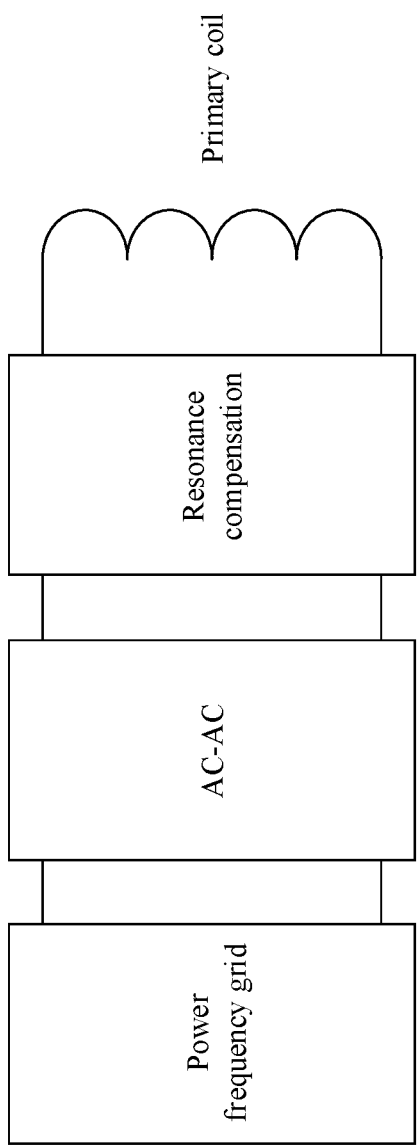
FIG. 2A and FIG. 2B are schematic diagrams of two typical energy management modules used in a primary side system in a high-power wireless power supply system.
Figure 2B:
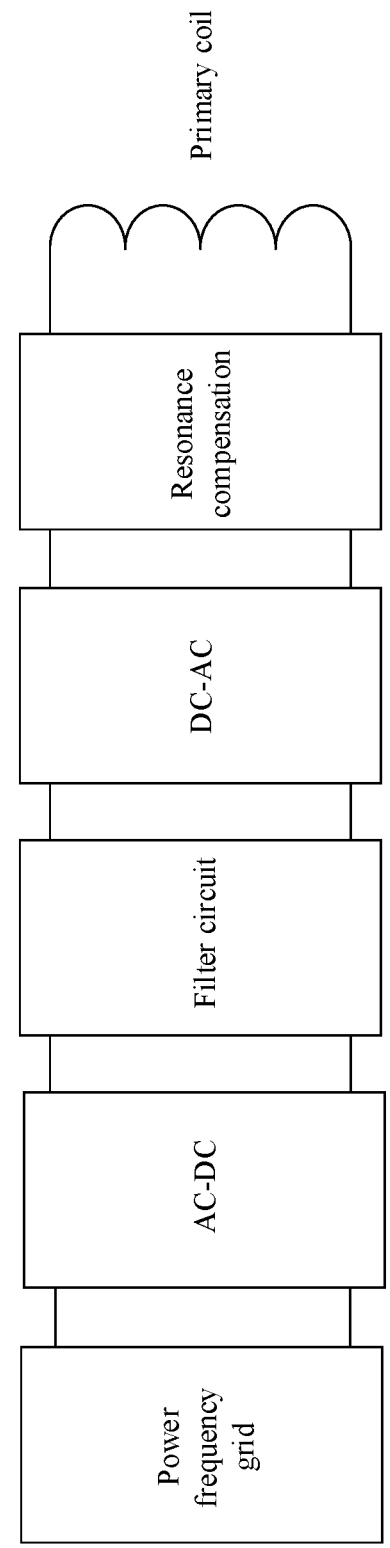

FIGS. 2A-2B are schematic diagrams of two typical energy management modules used in a primary side system in a high-power wireless power supply system. In FIG. 2A, the energy management module of the primary side system directly performs frequency conversion and amplitude modulation on a power-frequency alternating current by using an AC-AC circuit, to convert the power-frequency alternating current into a high-frequency alternating current required for resonance, so as to generate a high-frequency alternating magnetic field. Then, electric energy is transferred to a load end on a secondary side system through a primary coil obtained after resonance compensation, to implement dynamic wireless power supply. In FIG. 2B, the energy management module of the primary side system includes an alternating current (AC)-direct current (DC) circuit, a filter circuit, and a DC-AC circuit. The AC-DC circuit is usually an uncontrolled rectifier circuit, and the DC-AC circuit is a full-bridge inverter circuit.

Figure 3A:
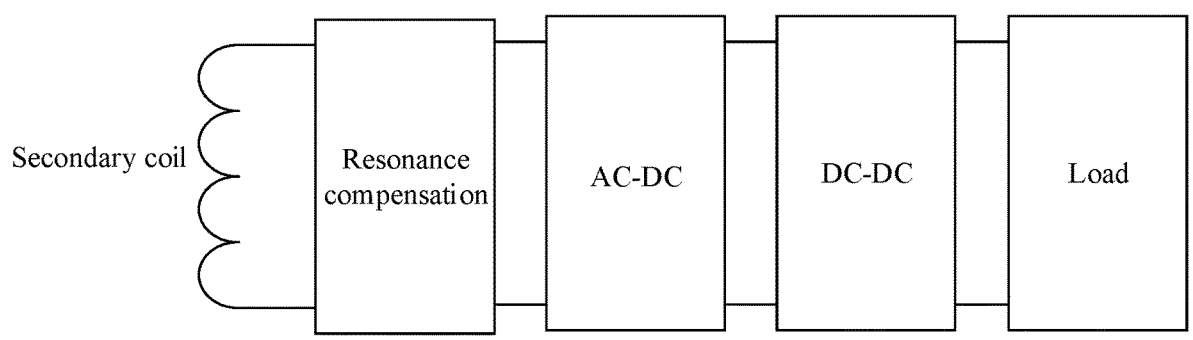
FIG. 3A and FIG. 3B are schematic diagrams of two typical energy management circuits used in a secondary side system in a high-power wireless power supply system.
Figure 3B:
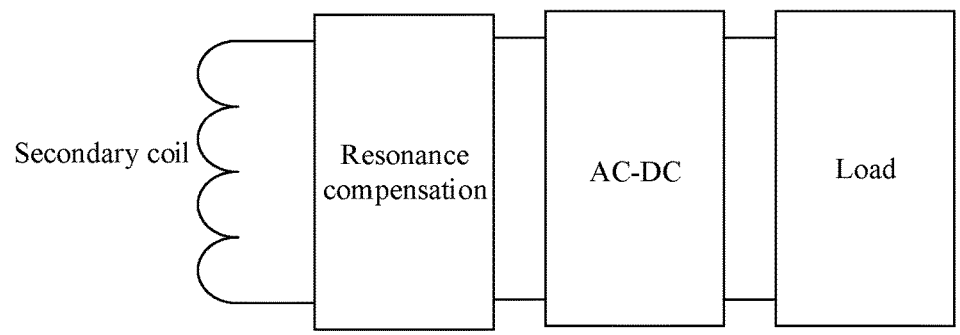

FIGS. 3A-3B are schematic diagrams of two typical energy management modules used in a secondary side system in a high-power wireless power supply system. After receiving a high-frequency alternating current from a primary coil by using a magnetic coupling function of a high-frequency magnetic field, the secondary side system may also need to perform power control and electric energy conversion on the high-frequency alternating current, to meet a load requirement. For example, in FIG. 3A, the energy management module of the secondary side system rectifies the high-frequency alternating current into a direct current by using an uncontrolled rectifier circuit (that is, an AC-DC circuit), to implement AC-DC conversion of electric energy, and performs power control by using a DC-DC circuit, to meet voltage and current requirements of a load. For another example, in FIG. 3B, the energy management module of the secondary side system uses a controlled rectifier circuit as a main module for AC-DC conversion of electric energy in the energy management module, and performs power modulation on the controlled rectifier circuit with reference to a load requirement, to implement output controllability.

However, as shown in FIGS. 2A-2B and FIGS. 3A-3B, in a high power application, the foregoing dynamic wireless power supply system usually uses a power diode as a rectifier component, and uses a MOSFET or an IGBT as a switching component. Due to a limitation of an existing manufacturing technology, the foregoing switching components cannot efficiently output energy at a high-power capacity.

In addition, when a load side requires a different power level, design selection may need to be performed again for a primary side system. Consequently, it is difficult to implement compatibility and effective control of power capacities.

In addition, when a load side of a secondary side system has a specific circuit parameter requirement, an additional circuit is required on a power grid side to implement voltage and current increase/decrease and dividing. A single-module cascade scheme usually cannot flexibly adjust voltage and current outputs, and an output voltage and an output current of a transmitter coil in the primary side system are less adjustable.

Therefore, embodiments of this application provide an energy management module, a transmitter end, a receiver end, and an electric vehicle. An energy management module is set. The energy management module may be used in the transmitter end and/or the receiver end, to flexibly adjust and control a power parameter, improve a power capacity, and resolve a module decoupling problem.

It should be understood that the primary side system described in this application may also be referred to as a primary side, upstream, a transmitter end, a transmitting apparatus, a primary-side transmitter end, or the like. The secondary side system may be referred to as a secondary side, a downstream, a receiver end, a receiver end module, a receiving apparatus, a secondary-side receiver end, or the like. The energy management module may also be referred to as a power conversion apparatus, a power conversion module, a power conversion circuit, a smallest module circuit, a minimum power module, or the like. A primary coil of a transformer may also be referred to as a primary winding, a primary coil, or the like. A secondary coil of the transformer may also be referred to as a secondary winding, a secondary coil, or the like. A compensation network may also be referred to as a compensation circuit, a compensation topology, or the like.

To make a person skilled in the art better understand the technical solutions provided in embodiments of this application, the following first describes an application scenario of the energy management module provided in embodiments of this application.

Figure 4:
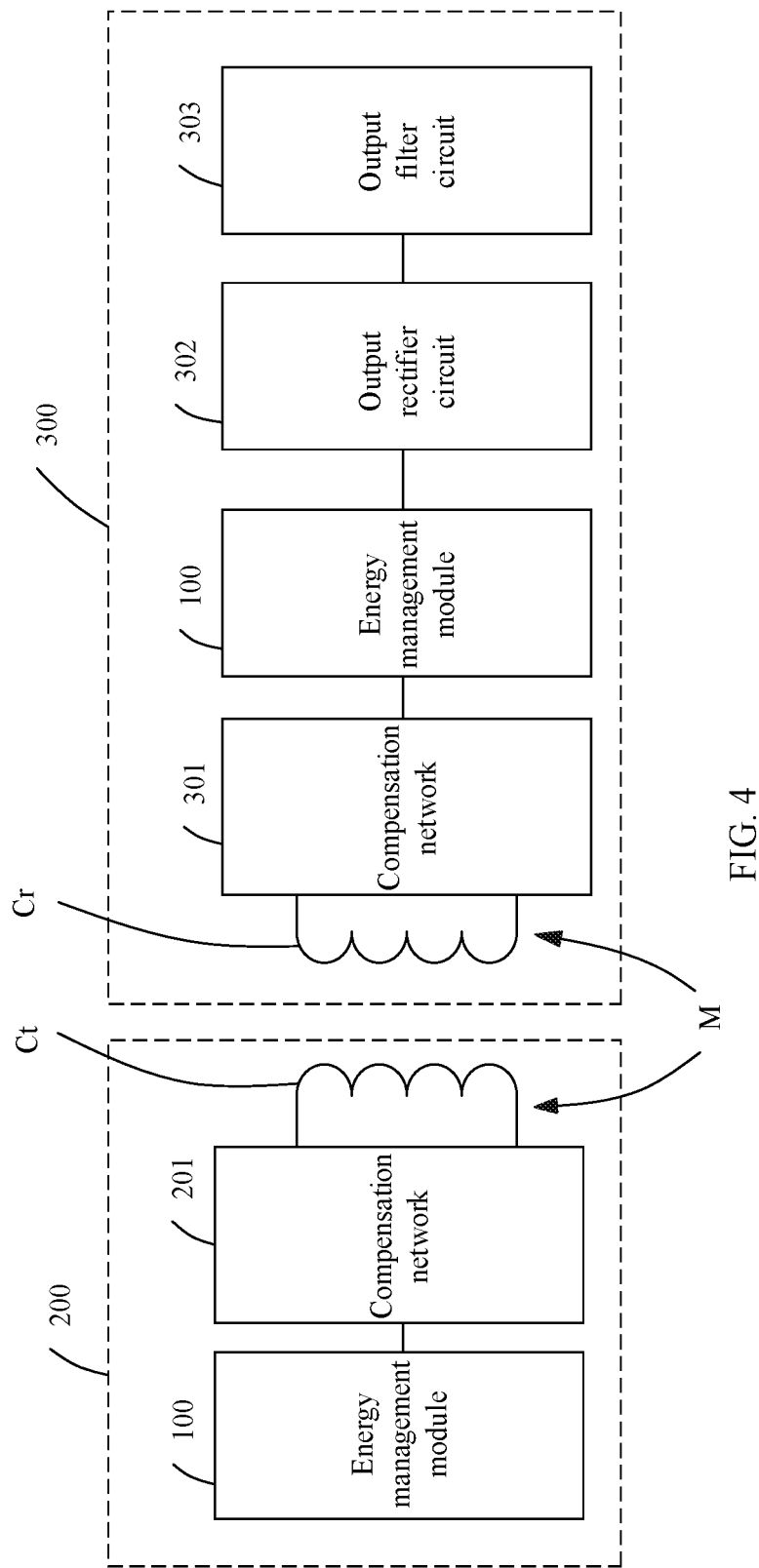
FIG. 4 is an application circuit diagram of an energy management module according to an embodiment of this application.

FIG. 4 is an application circuit diagram of an energy management module 100 according to an embodiment of this application. The energy management module 100 may be used in a transmitter end 200 and/or a receiver end 300 of a dynamic wireless power supply system 400. In this embodiment, an example in which the energy management module 100 is used in the transmitter end 200 and the receiver end 300 is used for description.

The transmitter end 200 further includes a compensation network 201 and a transmitter coil Ct. The receiver end 300 further includes a receiver coil Cr, a compensation network 301, an output rectifier circuit 302, and an output filter circuit 303. At the transmitter end 200, the energy management module 100, the compensation network 201, and the transmitter coil Ct are electrically connected in sequence. At the receiver end 300, the receiver coil Cr, the compensation network 301, the energy management module 100, the output rectifier circuit 302, and the output filter circuit 303 are electrically connected in sequence. The transmitter coil Ct and the receiver coil Cr form a magnetic coupling mechanism M. In addition, the energy management module 100, the compensation network 201, and the transmitter coil Ct of the transmitter end 200, and the receiver coil Cr, the compensation network 301, the energy management module 100, the output rectifier circuit 302, and the output filter circuit 303 of the receiver end 300 jointly form an energy management circuit 401 of the dynamic wireless power supply system 400.

It may be understood that, as shown in FIG. 4, the dynamic wireless power supply system 400 formed by the transmitter end 200 and the receiver end 300 may be configured to provide dynamic wireless power supply for a removable device with a high power level above a kilowatt level. It should be understood that in this application, the removable device includes but is not limited to a large-capacity or ultra-large-capacity removable device that is electrically towed or driven, or consumes electricity and that can apply a wireless power supply technology, such as an electric vehicle, a rail/non-rail transit vehicle, or an automated guide vehicle (Automated Guided Vehicle, AGV). In the following embodiments, for ease of description, an example in which the removable device is an electric vehicle is used for description.

Figure 5A:
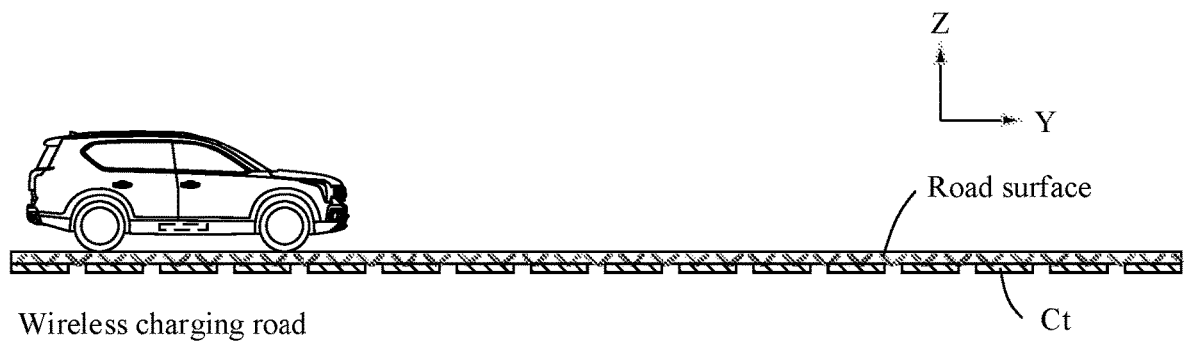
FIGS. 5A-5C are schematic diagrams of an application scenario of a dynamic wireless power supply system according to an embodiment of this application.
Figure 5B:
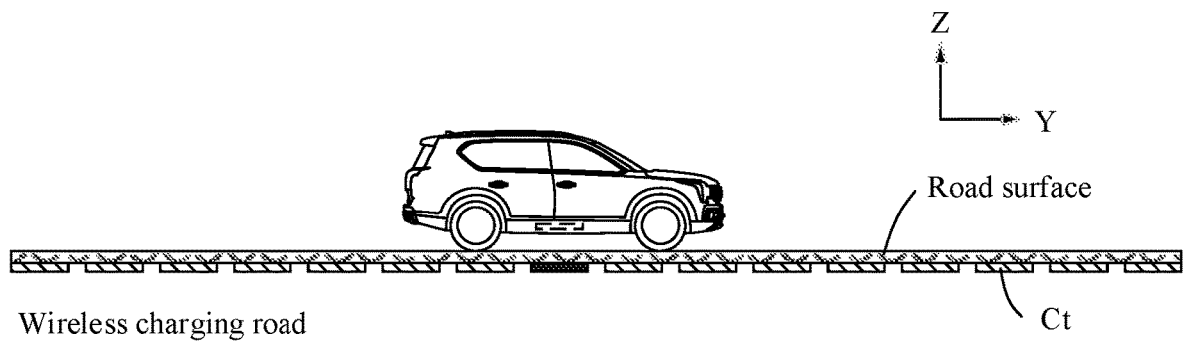
Figure 5C:
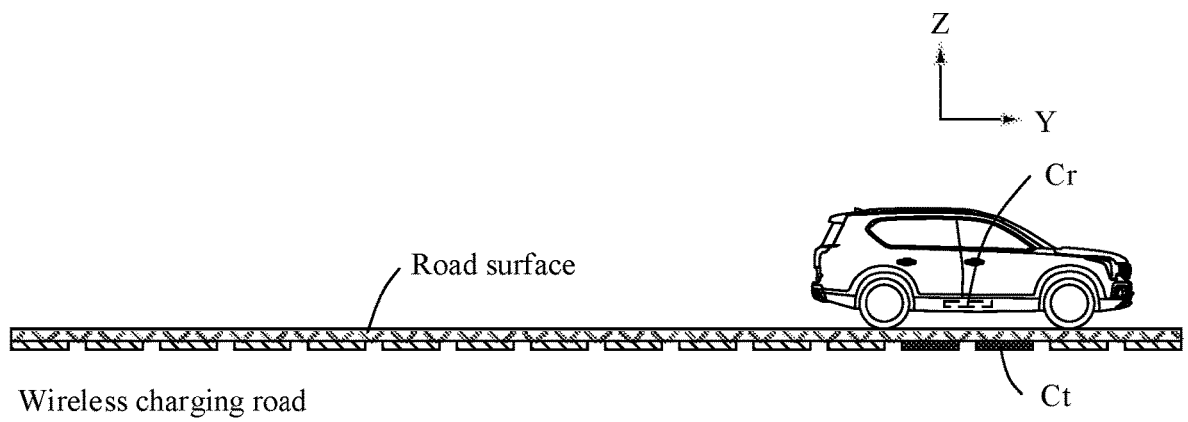

FIGS. 5A-5C are schematic diagrams of an application scenario of the dynamic wireless power supply system 400 according to an embodiment of this application. In some embodiments, when the receiver end 300 and the transmitter end 200 are used in the electric vehicle field, the transmitter end 200 is installed under the ground, and the receiver end 300 is installed on an electric vehicle. The receiver end 300 charges a vehicle-mounted power battery pack of the electric vehicle. Specifically, the transmitter end 200 includes energy management modules 100 and a transmitter coil Ct. The energy management modules 100 may be placed at intervals of a distance, and the energy management modules 100 may be on the ground or under the ground. The transmitter coil Ct in the magnetic coupling mechanism M is buried under the ground, and is arranged in a moving direction of the electric vehicle. The receiver end 300 wirelessly induces, through the receiver coil Cr, an alternating magnetic field sent by the transmitter end 200, and converts the alternating magnetic field into a direct current to charge a load.

As shown in FIGS. 5A-5C, the transmitter end 200 is installed under the ground, and the receiver end 300 is installed on the electric vehicle. The electric vehicle on which the receiver end 300 is installed travels on a road on which dynamic wireless power supply can be performed, the transmitter coil Ct in the magnetic coupling mechanism M is under the ground, and the electric vehicle is charged in a traveling process. The receiver end 300 is located at different locations, and interacts with the transmitter coil Ct located under the ground in the magnetic coupling mechanism M.

In this embodiment of this application, a dynamic wireless power supply technology of the electric vehicle is from a magnetic magnetically coupled resonant wireless power transfer technology. A wireless power transfer technology is a technology in which electric energy is t transferred in a contactless manner without an electric cable. Specifically, the transmitter end 200 is laid under a road, electric energy is converted into a high-frequency magnetic field by using an electromagnetic conversion principle, and a receiver coil and a power electronic conversion apparatus (that is, an energy management module) at an in-vehicle end (for example, an electric vehicle) convert the high-frequency magnetic field into electric energy to supply power to the traveling electric vehicle.

Figure 6:
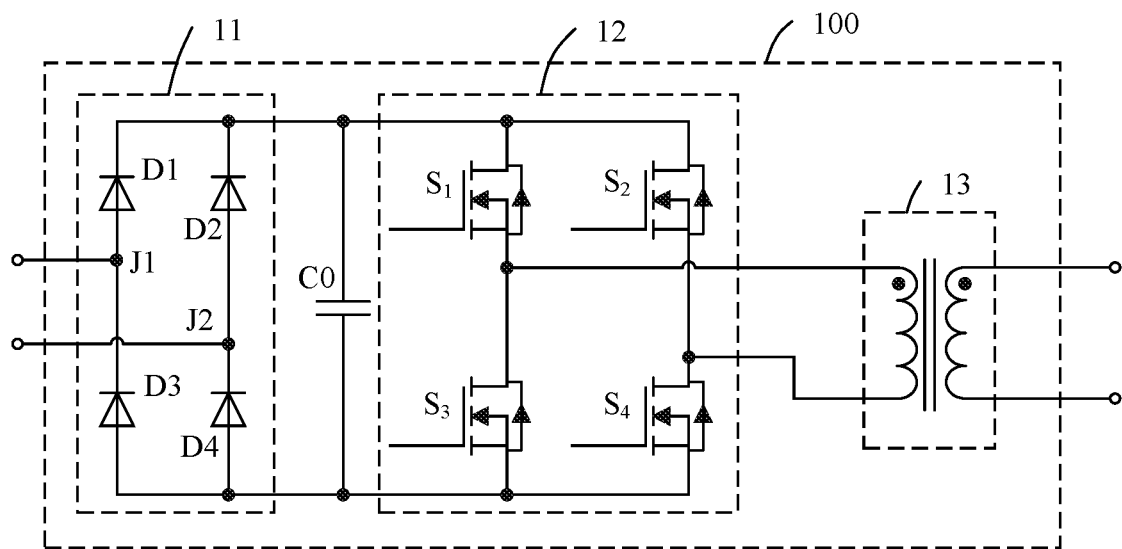
FIG. 6 is a schematic diagram of a circuit of an energy management module according to an embodiment of this application.

FIG. 6 is a circuit diagram of an energy management module according to an embodiment of this application. As shown in FIG. 6, in some embodiments, the energy management module 100 includes an AC-DC circuit 11, an inverter circuit 12, and a transformer 13.

For example, the AC-DC circuit 11 is an uncontrolled rectifier circuit, and an electric energy input of the AC-DC circuit 11 is mainly provided by a single phase or three phases. Certainly, in another embodiment, the electric energy input may also be provided by a plurality of phases. In this embodiment, for ease of description, an example in which the AC-DC circuit 11 is a single-phase uncontrolled rectifier circuit and a three-phase uncontrolled rectifier circuit (described in detail below) is used for description.

For example, the AC-DC circuit 11 includes four diodes D1 to D4. Cathodes of the diodes D1 and D2 are connected together, and are electrically connected to one end of the inverter circuit 12. Anodes of the diodes D1 and D2 are connected to cathodes of the diodes D3 and D4 respectively. Anodes of the diodes D3 and D4 are connected together, and are electrically connected to the other end of the inverter circuit 12. The AC-DC circuit 11 may form a two-phase rectifier circuit by disposing the four diodes D1 to D4. Certainly, a plurality of diodes, for example, six diodes, may alternatively be disposed in the AC-DC circuit 11, to form a high-power three-phase rectifier circuit (described in detail below).

In some embodiments, the inverter circuit 12 is a full-bridge inverter circuit, is electrically connected to the AC-DC circuit 11, and is configured to invert a direct current output by the AC-DC circuit 11 into an alternating current. The inverter circuit 12 includes four switching transistors $S_1$ to $S_4$.

It may be understood that a type of the switching transistor may be any one of the following: an IGBT, a MOSFET (referred to as MOS transistor below), a silicon carbide metal-oxide-semiconductor field-effect transistor (SiC MOSFET), or the like. When the switching transistor is a MOS transistor, the switching transistor may be specifically a PMOS transistor or an NMOS transistor. This is not specifically limited in this embodiment of this application. In the following embodiment, an example in which the switching transistors $S_1$ to $S_4$ are specifically NMOS transistors is used for description.

As shown in FIG. 6, drains of the switching transistors $S_1$ and $S_2$ are connected together, and are electrically connected to the cathodes of the diodes D1 and D2. A source of the switching transistor $S_1$ is electrically connected to a drain of the switching transistor $S_3$, and a source of the switching transistor $S_2$ is electrically connected to a drain of the switching transistor $S_4$. Sources of the switching transistors S3 and S4 are electrically connected together, and are electrically connected to the anodes of the diodes D3 and D4. Gates of the switching transistors $S_1$ to $S_4$ each are configured to receive a corresponding control signal. It may be understood that, in this embodiment of this application, the control signal may be a pulse width modulation (PWM) signal. When the control signal is at a low level, a corresponding switching transistor is turned off. When the control signal is at a high level, a corresponding switching transistor is turned on.

In some embodiments, the transformer 13 is a high-frequency transformer with a variable turn ratio. The transformer 13 includes a primary coil and a secondary coil. One end of the primary coil is electrically connected between the switching transistors $S_1$ and $S_3$, and the other end is electrically connected between the switching transistors S2 and S4. Two ends of the secondary coil of the transformer 13 are electrically connected to a corresponding compensation network or an output rectifier circuit.

Figure 7:
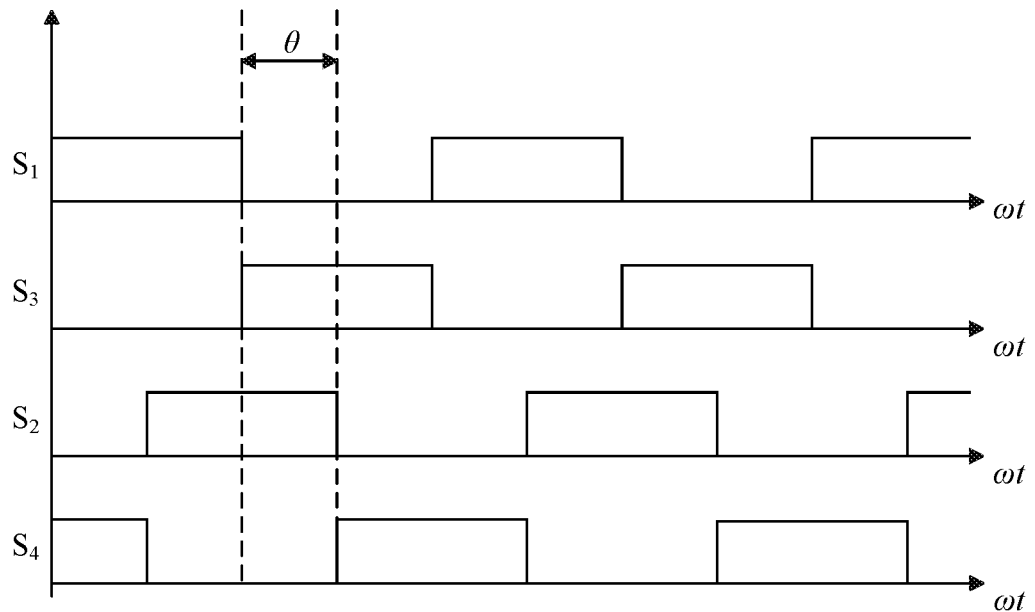
FIG. 7 is a schematic diagram of control signals of switching transistors in an inverter circuit in the energy management module shown in FIG. 6.

FIG. 7 is a schematic diagram of control signals of the switching transistors $S_1$ to $S_4$ in the inverter circuit 12 in FIG. 6. The inverter circuit 12 uses phase shift control with a fixed duty cycle, implements frequency control of an output alternating current by changing a carrier frequency of a modulation signal (that is, a control signal), and flexibly adjusts an output power by using a phase shift angle θ (described in detail below).

It may be understood that, in this embodiment of this application, the AC-DC circuit 11 and the inverter circuit 12 in the energy management module 100 may form an AC-DC-AC circuit. That is, the energy management module 100 includes at least an AC-DC-AC circuit, and implements alternating current-direct current-alternating current conversion of electric energy by using an uncontrolled rectifier and a full-bridge inverter, thereby balancing and controlling synchronous power transmission and modulation of a dynamic wireless power supply system in a multi-module condition. The energy management module 100 further includes the transformer 13, and the transformer 13 is a high-frequency transformer with a variable turn ratio. In this way, power isolation and a flexible ratio of circuit parameters may be implemented by adjusting a turn ratio of the transformer 13, and a problem that decoupling cannot be implemented and a circulating current and a current backflow easily occur in the conventional technology is resolved.

It may be understood that, in another embodiment, the energy management module 100 may further include a filter capacitor C0. One end of the filter capacitor C0 is electrically connected to the cathodes of the diodes D1 and D2. The other end of the filter capacitor C0 is electrically connected to the anodes of the diodes D3 and D4. The filter capacitor C0 is configured to perform filtering processing on a signal output by the AC-DC circuit 11.

It may be understood that, as described above, a first node J1 may be formed between the diodes D1 and D3, and a second node J2 may be formed between the diodes D2 and D4 in the energy management module 100. The first node J1 and the second node J2 form an input end of the energy management module 100. The secondary coil of the transformer 13 in the energy management module 100 forms an output end of the energy management module 100.

It may be understood that, as described above, the energy management module 100 may be used in the transmitter end 200 and/or the receiver end 300. When the energy management module 100 is used in the transmitter end 200, the input end (for example, the first node J1 and the second node J2 shown in FIG. 6) of the energy management module 100 may be electrically connected to a power grid, and the output end (for example, the secondary coil of the transformer 13 shown in FIG. 6) of the energy management module 100 is electrically connected to the compensation network 201 of the transmitter end 200.

For another example, when the energy management module 100 is used in the receiver end 300, the input end (for example, the first node J1 and the second node J2 shown in FIG. 6) of the energy management module 100 may be electrically connected to the compensation network 301 and the receiver coil Cr of the receiver end 300, and the output end (for example, the secondary coil of the transformer 13 shown in FIG. 6) of the energy management module 100 may be electrically connected to the output rectifier circuit 302 of the receiver end 300.

Figure 8:
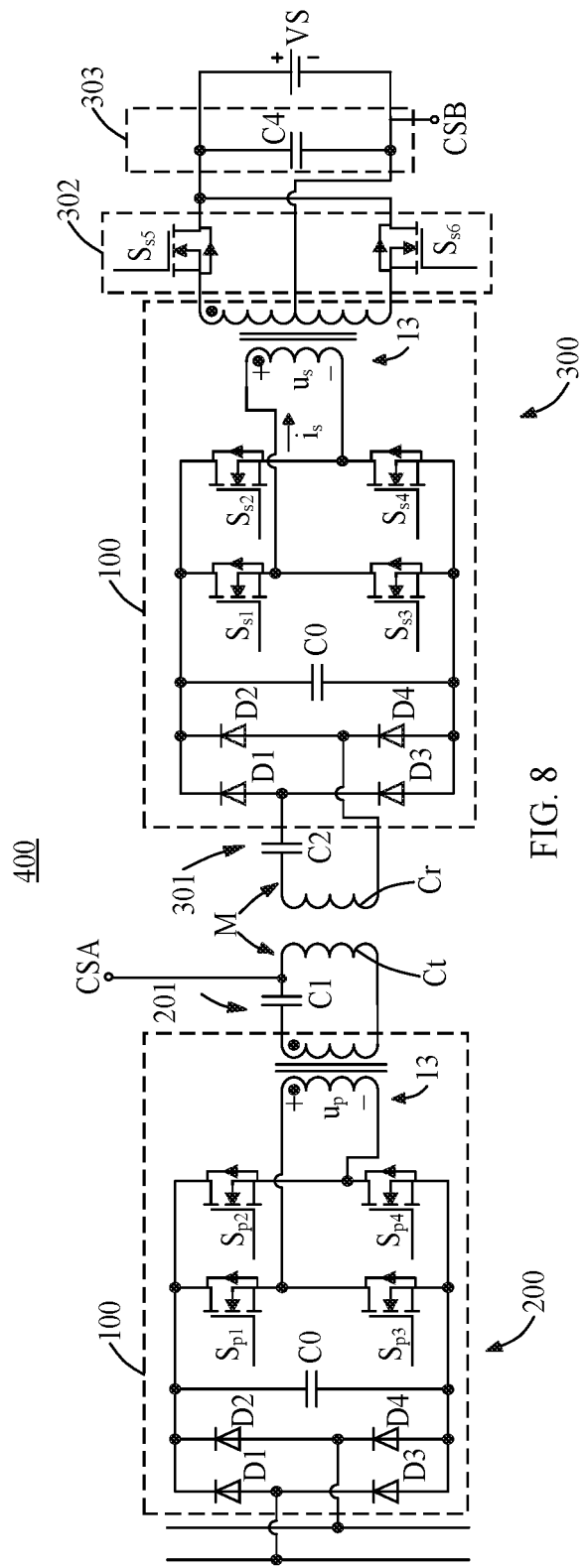
FIG. 8 is a schematic diagram of a circuit of using an energy management module in a transmitter end and a receiver end according to an embodiment of this application.

For example, FIG. 8 is a circuit diagram of using the energy management module 100 in the transmitter end 200 and the receiver end 300. As shown in FIG. 8, the energy management modules 100 may be applicable to a single transmitter end 200 and a single receiver end 300. Certainly, in another embodiment, a quantity of energy management modules 100 may be further adjusted according to a specific situation. For example, there are a plurality of energy management modules 100, and the plurality of energy management modules 100 may be separately connected in series-parallel at the transmitter end 200 and the receiver end 300, to perform power expansion. For example, N energy management modules 100 may be disposed at the transmitter end 200, and M energy management modules 100 may be disposed at the receiver end 300. Both N and M are integers greater than 1, and N and M may be equal or unequal.

It may be understood that, as shown in FIG. 8, the transmitter end 200 includes the energy management module 100, a compensation network 201, and a transmitter coil Ct. The energy management module 100 at the transmitter end 200 includes an AC-DC circuit 11, an inverter circuit 12, and a transformer 13. The AC-DC circuit 11 includes diodes D1 to D4. The inverter circuit 12 includes switching transistors $S_{p1}$ to $S_{p4}$. For structures, electrical connection relationships, and the like of the AC-DC circuit 11, the inverter circuit 12, and the transformer 13, refer to FIG. 6 and related descriptions. Details are not described herein again.

In this embodiment, the compensation network 201 includes a first compensation capacitor C1. The first compensation capacitor C1 and the transmitter coil Ct are connected to two ends of a secondary coil of the transformer 13 in series. The transmitter coil Ct is coupled to the receiver coil Cr of the receiver end 300.

It may be understood that, as described above, the first compensation capacitor C1 and the transmitter coil Ct are in a series (Series) structure. Therefore, the compensation network 201 is an S compensation network.

It may be understood that, as shown in FIG. 8, when the energy management module 100 is used in the transmitter end 200, the AC-DC circuit 11 of the energy management module 100 forms a two-phase rectifier circuit. Certainly, in another embodiment, an electric energy input of the AC-DC circuit 11 may also be provided by three phases or a plurality of phases in a special working condition. This is not limited herein.

It may be understood that, as shown in FIG. 8, the energy management module 100 includes at least the AC-DC circuit 11, the inverter circuit 12, and the transformer 13. The AC-DC circuit 11 and the inverter circuit 12 form an AC-DC-AC circuit, and the transformer 13 is a variable turn ratio transformer. That is, the energy management module 100 at the transmitter end 200 includes at least the AC-DC-AC circuit and the variable turn ratio transformer, and implements alternating current-direct current-alternating current conversion of electric energy by using an uncontrolled rectifier and a full-bridge inverter, thereby balancing and controlling synchronous power transmission and modulation of the dynamic wireless power supply system in the multi-module condition. The energy management module 100 further includes the transformer 13, and the transformer 13 is a high-frequency transformer with a variable turn ratio. In this way, power isolation and a flexible ratio of circuit parameters may be implemented by adjusting a turn ratio of the transformer 13, and a problem that decoupling cannot be implemented and a circulating current and a current backflow easily occur in the conventional technology is resolved.

Figure 9:
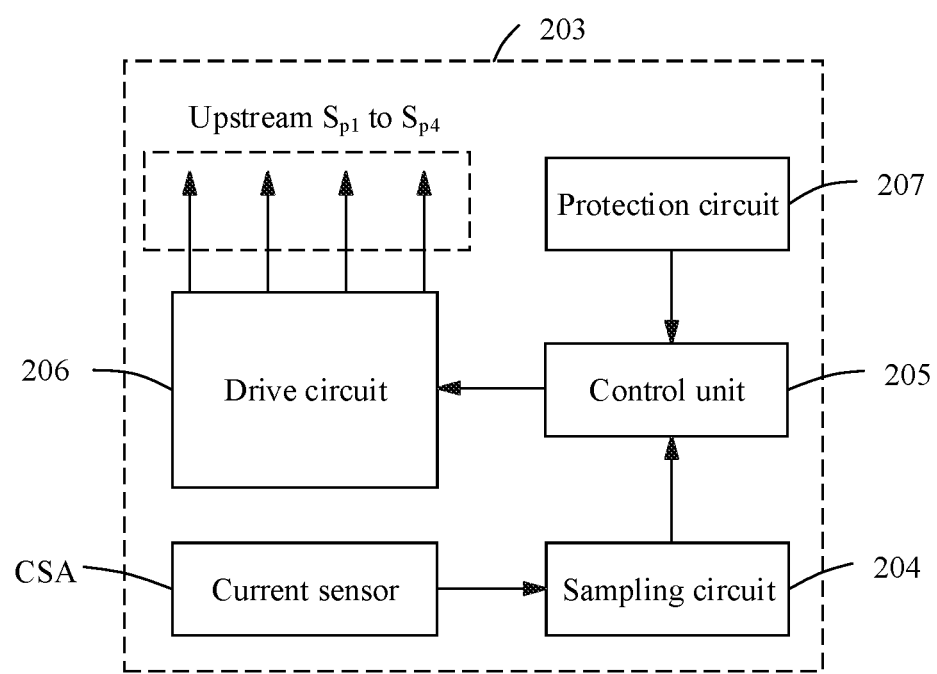
FIG. 9 is a schematic diagram of a circuit of a transmitter end control system used in a transmitter end according to an embodiment of this application.

FIG. 9 is a schematic diagram of a circuit of a transmitter end control system 203 used in the transmitter end 200. As shown in FIG. 9, the transmitter end control system 203 is configured to implement upstream constant current synchronization control. The transmitter end control system 203 includes a current sensor CSA, a sampling circuit 204, a control unit 205, and a drive circuit 206. The current sensor CSA is electrically connected to the transmitter coil Ct (refer to FIG. 8), to monitor and sample an instantaneous current signal $i_p$ of the transmitter coil Ct.

The sampling circuit 204 is electrically connected to the current sensor CSA, and is configured to: receive a sampled current signal $i_p$, process the current signal $i_p$ (for example, perform filtering, amplitude limiting, and analog-to-digital conversion on the current signal), and output a processed current signal to the control unit 205.

The control unit 205 is electrically connected to the sampling circuit 204, and is configured to: receive the processed current signal, and output a corresponding drive signal based on the current signal.

The drive circuit 206 is electrically connected to the control unit 205. The drive circuit 206 is configured to: receive the drive signal, and output a control signal with a fixed duty cycle to the switching transistors $S_{p1}$ to $S_{p4}$ of the inverter circuit 12 based on the drive signal, to control turn-on and turn-off of the corresponding switching transistors $S_{p1}$ to $S_{p4}$.

Figure 10:
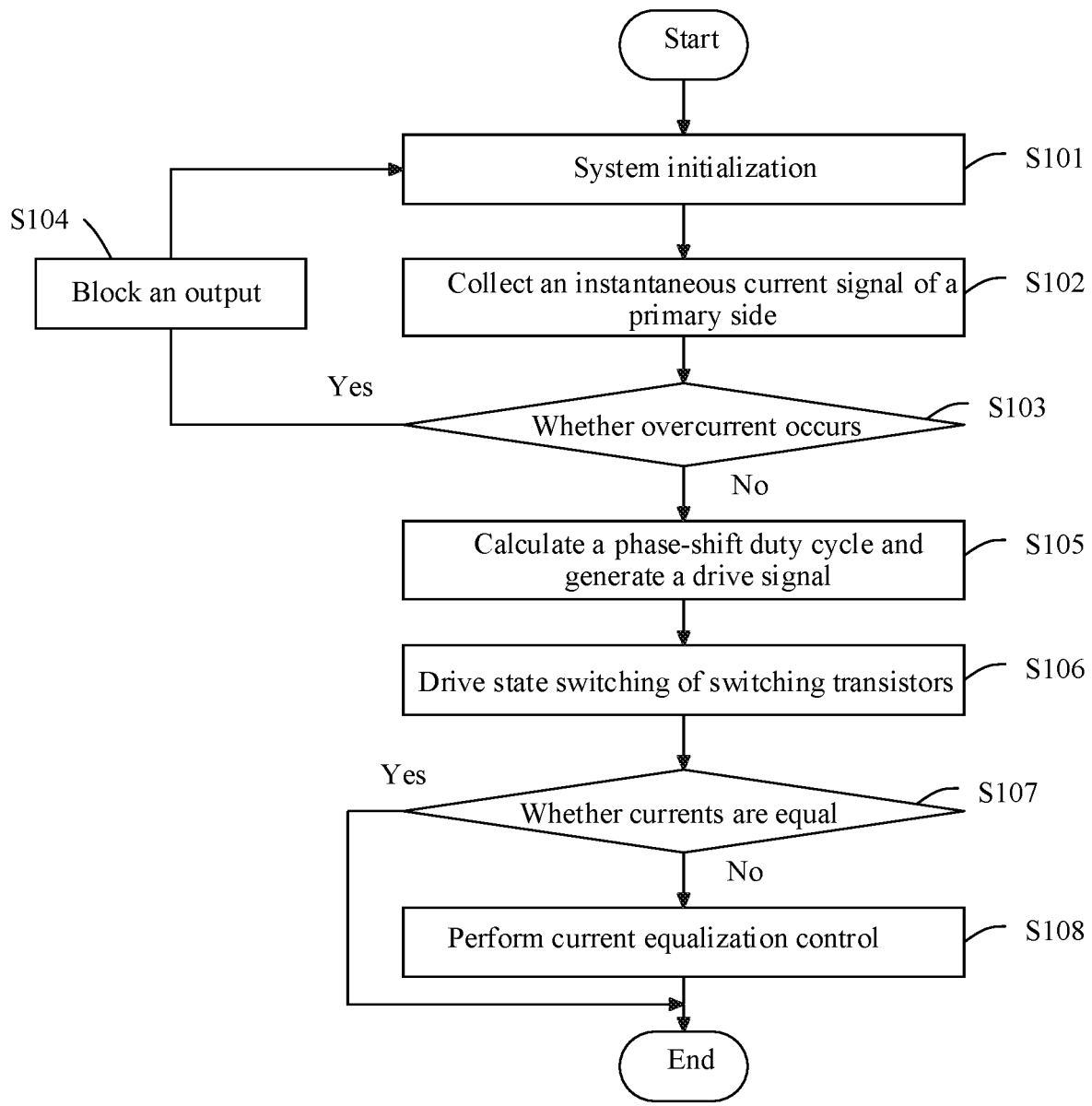
FIG. 10 is a control flowchart of the transmitter end control system shown in FIG. 9.

FIG. 10 is a control flowchart of the transmitter end control system 203 shown in FIG. 9. First, the system is initialized (refer to step S101). Then, the transmitter end control system 203 collects the instantaneous current signal $i_p$ by using the current sensor CSA, processes the collected signal by using the sampling circuit 204, and outputs the processed signal to the control unit 205 (refer to step S102). The control unit 205 receives the processed current signal, and determines, based on the current signal, whether overcurrent occurs in the current signal (refer to step S103). When determining that overcurrent occurs, the control unit 205 may generate an interrupt signal by using an internal protection program of the control unit 205, to output the interrupt signal to the drive circuit 206, so that the drive circuit 206 blocks an output, that is, stops an output, to control and protect a circuit of the transmitter end 200 (refer to step S104).

Refer to FIG. 9 again. Certainly, in some other embodiments, the transmitter end control system 203 may further include a protection circuit 207. The protection circuit 207 is electrically connected to the control unit 205, and is configured to autonomously block control signals of the switching transistors $S_{p1}$ to $S_{p4}$ under control of the control unit 205 (for example, receive the interrupt signal output by the control unit 205).

Refer to FIG. 10 again. It may be understood that in step S103, when the control unit 205 determines that no overcurrent occurs, the control unit 205 may further run closed-loop constant current control. Specifically, the control unit 205 first calculates a phase-shift duty cycle based on the received current signal, and generates a corresponding drive signal (refer to step S105). In this way, the drive circuit 206 receives the drive signal, and generates a corresponding control signal (for example, a PWM control signal), to drive the switching transistors $S_{p1}$ to $S_{p4}$ to turn on or off (that is, state switching, refer to step S106).

It may be understood that, in some other embodiments, when the transmitter end 200 needs to perform power expansion, a plurality of energy management modules 100 may be disposed at the transmitter end 200, and input ends of the energy management modules 100 are connected in parallel to a power grid bus, to keep input voltages equal. In addition, the plurality of energy management modules 100 use a same control system (for example, the transmitter end control system 203 shown in FIG. 9) to control synchronous working. In this way, fast adjustment can be performed, and a phenomenon such as a circulating current does not occur. That is, when the transmitter end 200 includes the plurality of energy management modules 100, the energy management modules 100 may be connected in parallel. Refer to FIG. 10 again. Correspondingly, the control unit 205 is further configured to: after completing state switching of the switching transistors $S_{p1}$ to $S_{p4}$ of the energy management modules 100, determine, based on current signals of the energy management modules 100 at this time, whether currents of the energy management modules 100 are equal (refer to step S107, that is, determine whether the currents of the energy management modules 100 are the same). When the control unit 205 determines that the currents of the energy management modules 100 are equal, the process ends. When determining that the currents of the energy management module 100 are not equal, the control unit 205 may perform current equalization control (refer to step S108). For example, the control unit 205 may output a corresponding drive signal to a corresponding drive circuit 206, to control or drive state switching of corresponding switching transistors $S_{p1}$ to $S_{p4}$ by using the corresponding drive circuit 206, so that the currents of the energy management modules 100 are equal.

It may be understood that, as described above, when the energy management module 100 is used in the transmitter end 200, and the plurality of energy management modules 100 are connected in parallel to the power grid bus for extended use, a plurality of groups of transmitter ends 200 may be formed. The groups of transmitter ends 200 may be controlled by a lumped control system, that is, controlled by a same control system (for example, the transmitter end control system 203), to ensure that switching transistors $S_{p1}$ to $S_{p4}$ of circuits at all levels are driven at the same time, and eliminate power imbalance between the groups of circuits.

It may be understood that, in another embodiment, when the transmitter end 200 includes a plurality of (for example, N) energy management modules 100, a corresponding transmitter end control system 203 may also be disposed for each energy management module 100. A current sensor CSA in each transmitter end control system 203 is electrically connected to a primary coil of a corresponding transformer 13, to monitor and sample a primary-side instantaneous current signal of the transformer 13. In this case, the corresponding transmitter end control system 203 is disposed for each energy management module 100, so that modularization can be effectively implemented. In addition, in this case, to output a synchronous phase shift control signal, an additional controller is generally disposed at the transmitter end 200, to uniformly control control units 205 in the plurality of transmitter end control systems 203, so as to drive a plurality of inverter circuits to work synchronously.

In conclusion, when the energy management module 100 is used in the transmitter end 200, at least the following beneficial effects are included:

(1) In a large capacity scenario, input-parallel inverter circuits 12 on a primary side use synchronous phase shift control, and a turn ratio of the transformer 13 is N1:N2. In this way, an orderly ratio of a coil voltage (that is, the transmitter coil Ct) to a coil current at the transmitter end under synchronous modulation can be implemented by adjusting the turn ratio of the transformer 13, to meet a specific power requirement of a load side.

(2) Series-parallel power conversion circuits (that is, the energy management modules 100) share a power requirement required by the load side, to reduce a current stress borne by a switching component (for example, the switching transistors $S_{p1}$ to $S_{p4}$) in the circuit, and increase an upper threshold of an input current.

(3) A power capacity may be flexibly increased or decreased by adding or removing a series-parallel power conversion circuit (that is, the energy management module 100), to improve a system response speed.

(4) When the plurality of energy management modules 100 are disposed, each energy management module 100 includes the transformer 13. That is, an independent transformer 13 is connected to a transmitter end coil in series, to implement coupling and separation of output-series ports, eliminate a circulating current, implement power isolation and integration, and effectively improve an overall power capacity of a primary-side transmitter end.

Refer to FIG. 8 again. It may be understood that when the energy management module 100 is used in the receiver end 300, the receiver end 300 further includes a receiver coil Cr, a compensation network 301, an output rectifier circuit 302, an output filter circuit 303, and a receiver end control system 304 (refer to FIG. 11). The receiver coil Cr, the compensation network 301, the energy management module 100, the output rectifier circuit 302, and the output filter circuit 303 are electrically connected in sequence.

The receiver coil Cr and the transmitter coil Ct form a magnetic coupling mechanism M. An input end of the energy management module 100 at the receiver end 300 is coupled to the transmitter end 200 through the compensation network 301 and the receiver coil Cr. An output end of the energy management module 100 at the receiver end 300 is electrically connected to a load through the output rectifier circuit 302 and the output filter circuit 303.

It may be understood that the energy management module 100 at the receiver end 300 includes an AC-DC circuit 11, an inverter circuit 12, a transformer 13, and a filter capacitor C0. The inverter circuit 12 includes four switching transistors Ss1 to Ss4. Voltages at both ends of a primary coil of the transformer 13 are us. A circuit structure and a control signal of the energy management module 100 at the receiver end 300 are similar to those of the energy management module 100 at the transmitter end 200. For details, refer to FIG. 6, FIG. 7, and related descriptions. Details are not described herein again.

As shown in FIG. 8, the compensation network 301 of the receiver end 300 includes a second compensation capacitor C2. One end of the second compensation capacitor C2 is electrically connected to the first node J1 (refer to FIG. 6) of the energy management module 100 at the receiver end 300, and the other end is electrically connected to the second node J2 (refer to FIG. 6) of the energy management module 100 at the receiver end 300 after being connected to the receiver coil Cr in series. That is, the second compensation capacitor C2 and the receiver coil Cr are disposed in series.

Similarly, as described above, in this embodiment of this application, the second compensation capacitor C2 and the receiver coil Cr are of a series structure (Series), and the compensation network 301 is an S compensation network. Therefore, a structure combination of the compensation network 201 at the transmitter end 200 and the compensation network 301 at the receiver end 300 forms an S-S type. Certainly, in another embodiment of this application, the structure combination of the compensation network 201 at the transmitter end 200 and the compensation network 301 at the receiver end 300 may alternatively form a P-P type, an S-P type, a P-S type, an LCL-LCL type, an LCL-P type, an LCC-S type, an LCC-LCC type, or the like. This is not specifically limited in this embodiment of this application.

It may be understood that, in some embodiments, the output rectifier circuit 302 is a controlled rectifier circuit, and includes two switching transistors Ss5 and Ss6. In this embodiment of this application, both the switching transistors Ss5 and Ss6 are NMOS transistors. A source of the switching transistor Ss5 and a source of the switching transistor Ss6 are electrically connected to two ends of a secondary coil of the transformer 13 at the receiver end 300 respectively. A drain of the switching transistor Ss5 is connected to a drain of the switching transistor Ss6. Both a gate of the switching transistor Ss5 and a gate of the switching transistor Ss6 are configured to receive a control signal, for example, a PWM control signal.

In some embodiments, the output filter circuit 303 includes a filter capacitor C4. One end of the filter capacitor C4 is electrically connected to the drain of the switching transistor Ss5 and the drain of the switching transistor Ss6, and is connected to one end of the load. The other end of the filter capacitor C4 is electrically connected between two ends of the secondary coil of the transformer 13 at the receiver end 300, and is connected to the other end of the load.

It may be understood that, when the energy management module 100 is used in both the transmitter end 200 and the receiver end 300 of the dynamic wireless power supply system 400, although upstream and a downstream (that is, the transmitter end 200 and the receiver end 300) of the dynamic wireless power supply system 400 use the energy management modules 100 of the same smallest module, functions of the two energy management modules 100 are different. Therefore, the energy management modules 100 at the transmitter end 200 and the receiver end 300 need to be controlled separately. That is, a structure of a control system (that is, the receiver end control system 304) used in the receiver end 300 is different from a structure of a control system (that is, the transmitter end control system 203) used in the transmitter end 200. To implement dynamically adjustable power output of a target load, a smallest module circuit (for example, the energy management module 100) of a downstream receiver end needs to implement closed-loop voltage or current given control through impedance matching.

Figure 11:
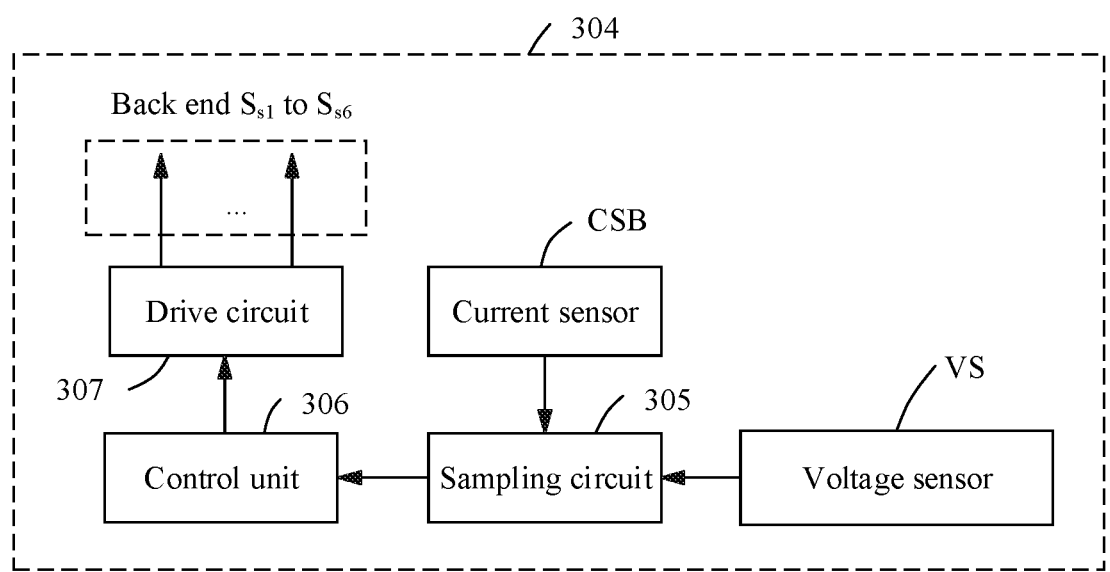
FIG. 11 is a schematic diagram of a circuit of a receiver end control system used in a receiver end according to an embodiment of this application.

Specifically, FIG. 11 is a schematic diagram of a circuit of the receiver end control system 304 used in the receiver end 300. The receiver end control system 304 is configured to implement power impedance matching control of a downstream (that is, the receiver end 300) of the dynamic wireless power supply system 400. The receiver end control system 304 includes a current sensor CSB, a voltage sensor VS, a sampling circuit 305, a control unit 306, and a drive circuit 307.

Structures, functions, and/or effects of the current sensor CSB, the sampling circuit 305, the control unit 306, and the drive circuit 307 are similar to those of the current sensor CSA, the sampling circuit 204, the control unit 205, and the drive circuit 206 at the transmitter end control system 203. For details, refer to FIG. 9 and related descriptions. Details are not described herein again.

In this embodiment of this application, the receiver end control system 304 transmits an output voltage signal uo (refer to FIG. 8) and an output current signal io (refer to FIG. 8) to the control unit 306 through the sampling circuit 305 by using the voltage sensor VS and the current sensor CSB, to drive the inverter circuit 12 at the receiver end 300 and complete closed-loop control. In addition, the control unit 306 may further drive the output rectifier circuit 302, to implement efficient and controllable rectifier output. In addition, the receiver end 300 may further effectively control a transmission characteristic such as maximum efficiency tracking or maximum power transmission by using the receiver end control system 304.

Figure 12:
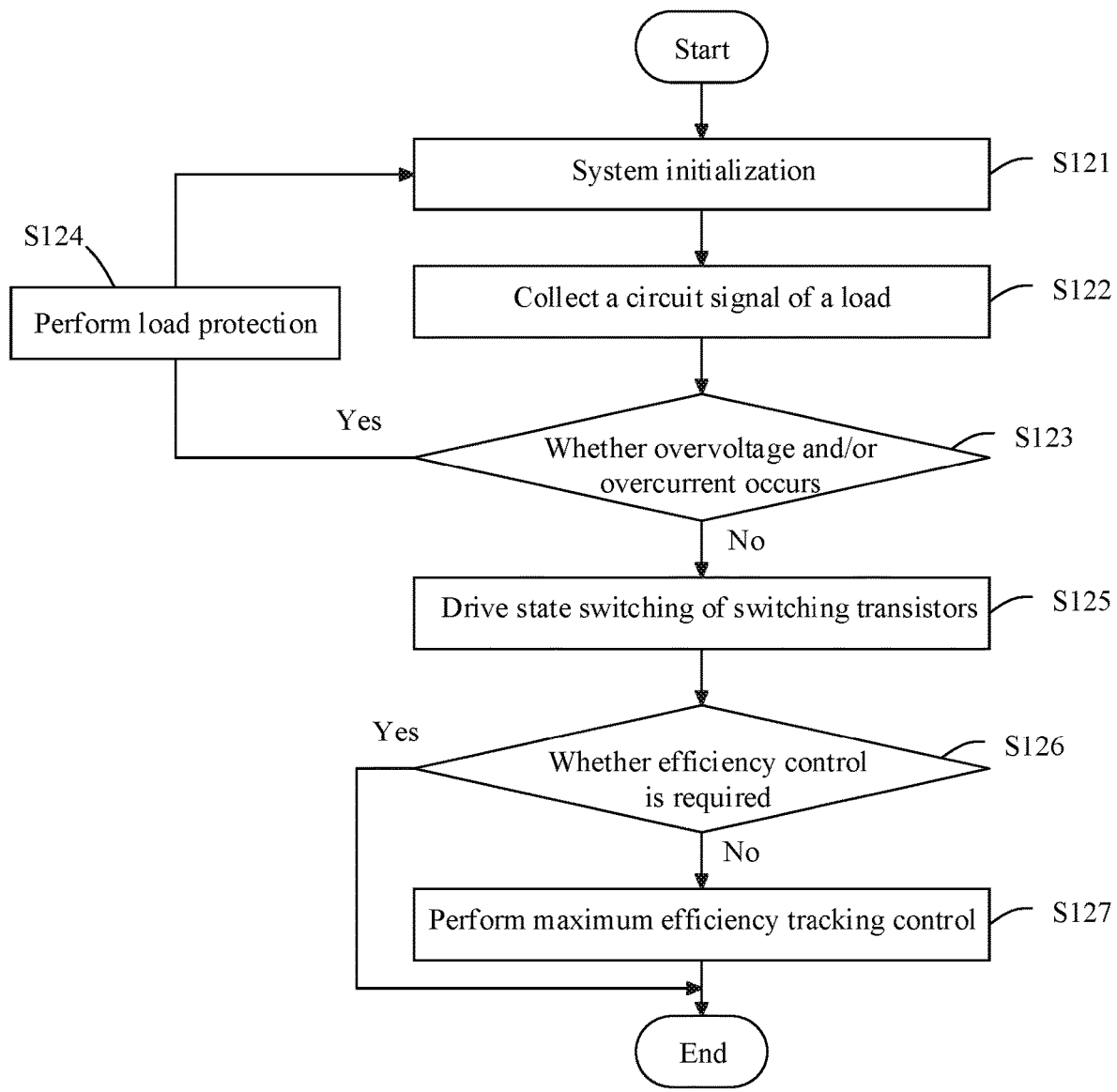
FIG. 12 is a control flowchart of the receiver end control system shown in FIG. 11.

Specifically, FIG. 12 is a control flowchart of the receiver end control system 304 shown in FIG. 11. First, the system is initialized (refer to S121). Then, the receiver end control system 304 collects a circuit signal from an output end of a load by using the current sensor CSB and the voltage sensor VS, that is, the voltage signal uo and the current signal io, processes the collected circuit signal by using the sampling circuit 305, and outputs the processed circuit signal to the control unit 306 (refer to step S122). The control unit 306 receives the processed circuit signal, and determines, based on the circuit signal, whether overvoltage and/or overcurrent occurs (refer to step S123). When determining overvoltage and/or overcurrent occurs, the control unit 306 may generate an interrupt signal by using an internal protection program of the control unit 306, to control and protect the load (refer to step S124).

It may be understood that, in step S123, when the control unit 306 determines that no overcurrent or overvoltage occurs, the control unit 306 may perform closed-loop output control. That is, the control unit 306 drives state switching of the switching transistors Ss1 to Ss6 (refer to step S125) to complete closed-loop control, and drives the output rectifier circuit 302 to implement efficient and controllable rectifier output.

It may be understood that, in another embodiment, the control unit 306 may be further configured to determine whether efficiency control is required (refer to step S126). When it is determined that efficiency control does not need to be performed, the process ends. When it is determined that efficiency control needs to be performed, maximum efficiency tracking control may be performed (refer to step S127). That is, the receiver end 300 may further effectively control a transmission characteristic such as maximum efficiency tracking or maximum power transmission by using the receiver end control system 304.

In conclusion, when the energy management module 100 is used in the receiver end 300, at least the following beneficial effects are included:

(1) Synchronous frequency conversion and voltage regulation power transmission of dynamic wireless power supply is implemented by using a full-bridge inverter circuit (that is, the inverter circuit 12) of synchronous modulation and phase shift with an expandable capacity, to effectively suppress voltage fluctuation caused by a location change or the like of a pickup coil (that is, the receiver coil Cr) in a dynamic magnetic coupling process.

(2) When the receiver end 300 includes a plurality of receiver coils Cr, the plurality of receiver coils Cr may output more secondary-side power under low current and voltage stress of a resonant cavity, to improve a power supply capability of a load side.

(3) When a plurality of energy management modules 100 are used in the receiver end 300, a plurality of receiver ends 300 may be formed, and energy transferred by the plurality of receiver ends 300 is aggregated and supplied to the load side by using a decoupling transformer structure (that is, the transformer 13). By designing and adjusting a turn ratio of the transformer 13, electric energy can be transferred on the load side at a ratio, to improve an output capability.

It may be understood that, to describe this application more specifically, the following describes the technical solutions of this application in detail by using Example 1 and Example 2 with reference to FIG. 13 to FIG. 23B.

EXAMPLE 1

Figure 13:
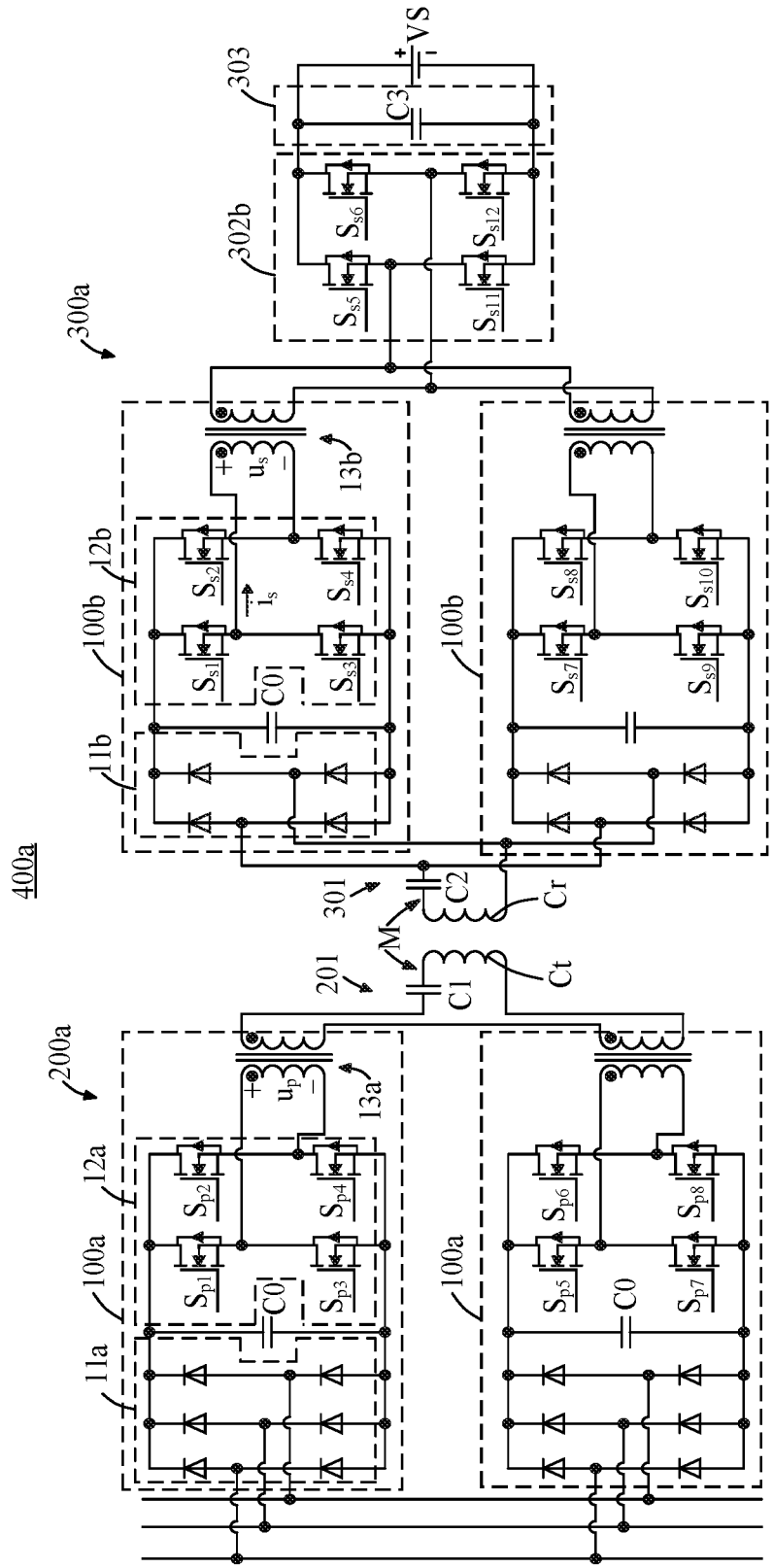
FIG. 13 is a schematic diagram of a circuit of using an energy management module to a dynamic wireless power supply system according to Example 1 of this application.

FIG. 13 is a schematic diagram of a circuit of using a large-capacity energy management module in a dynamic wireless power supply system 400*a* in Example 1. In Example 1, both a transmitter end and a receiver end include a plurality of energy management modules of smallest modules. For example, as shown in FIG. 13, a transmitter end 200*a* includes two energy management modules 100*a*, and the receiver end 300*a* includes two energy management modules 100*b*. Each energy management module 100*a* or 100*b* includes an uncontrolled rectifier (that is, an AC-DC circuit 11*a* or 11*b*), an inverter circuit 12*a* or 12*b*, and a transformer 13*a* or 13*b*. In addition, in Example 1, the AC-DC circuit 11*a* of the energy management module 100*a* of the smallest module at the transmitter end 200*a* uses a three-phase uncontrolled rectifier circuit, to implement conversion from a high-power three-phase alternating current to a direct current.

It may be understood that, as shown in FIG. 13, secondary-side windings of the transformers 13*a* in the two energy management modules 100*a* of the smallest modules at the transmitter end 200*a* form a series structure. In Example 1, a compensation network 201 at the transmitter end 200*a* includes a first compensation capacitor C1. The first compensation capacitor C1 is connected to a transmitter coil Ct in series.

A compensation network 301 of the receiver end 300*a* includes a second compensation capacitor C2. The second compensation capacitor C2 is connected to a receiver coil Cr in series, so that the second compensation capacitor C2 and the first compensation capacitor C1 of the transmitter end 200*a* form an S-S type resonant circuit. Output ends of the two transformers 13*b* at the receiver end 300*a* form an output-parallel structure. Certainly, in another embodiment, the output ends of the two transformers 13*b* at the receiver end 300*a* may also form an output series structure. This is not specifically limited herein.

Figure 14:
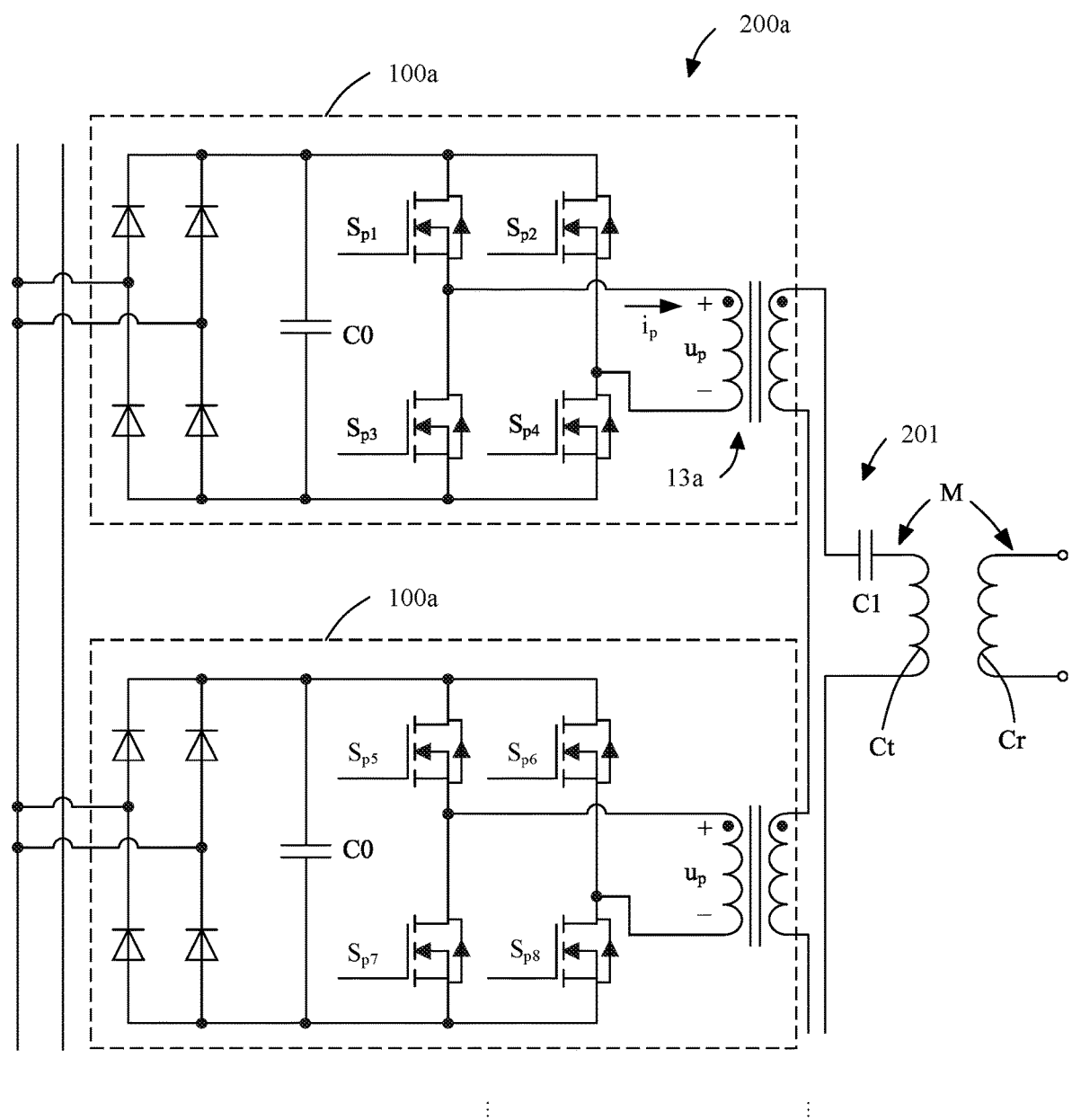
FIG. 14 is a schematic diagram of a transmitter end shown in FIG. 13 including a plurality of energy management modules.
Figure 15:
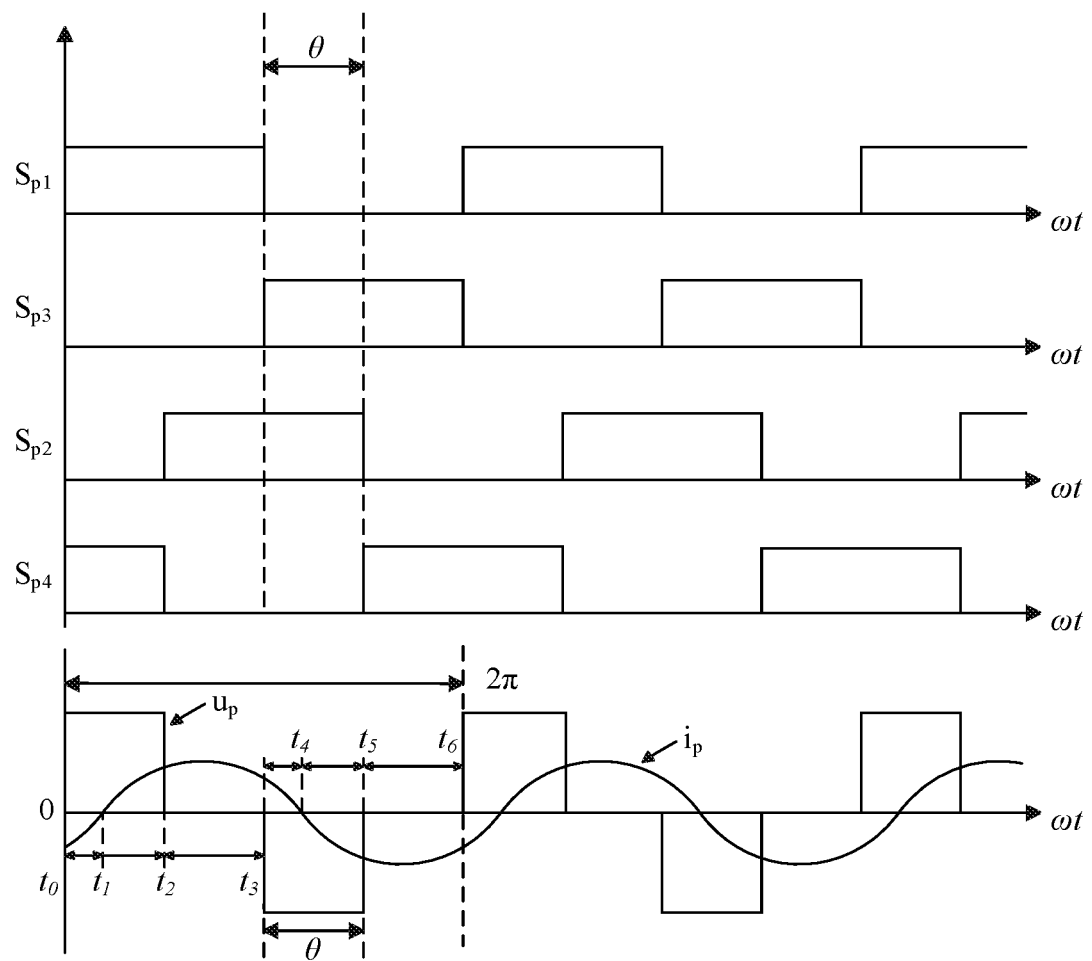
FIG. 15 is a diagram of PWM control signals and a circuit waveform in a transmitter end control system at the transmitter end shown in FIG. 13.

It may be understood that, with reference to FIG. 14, FIG. 15, and FIGS. 16A-16F, the following describes a working state of the transmitter end 200*a* by using an example in which an input end of the transmitter end 200*a* is electrically connected to a power frequency alternating current bus. FIG. 14 is a schematic diagram of the transmitter end 200*a* including the plurality of energy management modules 100*a*. FIG. 15 is a diagram of PWM control signals and a circuit waveform in a transmitter end control system 203*a* at the transmitter end 200*a*. FIGS. 16A-16F are schematic diagrams of single-period working states of a group of switching transistors Sp1 to Sp4 at the transmitter end 200*a*.

An input end of the energy management module 100*a* at the transmitter end 200*a* is connected to a power grid side in parallel, and is configured to perform AC-DC-AC electric energy conversion on a power frequency alternating current. The uncontrolled rectifier (that is, the AC-DC circuit 11*a*) completes low-frequency AC-DC conversion. After being filtered by a filter capacitor C0, a direct current is converted into a high-frequency alternating current through the inverter circuit 12*a* under synchronous phase shift modulation. The high-frequency alternating current is aggregated and coupled to the compensation network 201 at the transmitter end 200*a* through an output-series decoupling transformer structure (that is, the transformer 13*a*), and then transmitted to the receiver end 300*a* (that is, the load side) through the transmitter coil Ct of the transmitter end 200*a*, to complete dynamic wireless power supply.

It may be understood that, as shown in FIG. 14, when the transmitter end 200*a* includes a plurality energy management modules 100*a*, the inverter circuit 12*a* in each energy management module 100*a* uses synchronous phase shift control, and a control signal and a circuit waveform of the inverter circuit 12a are shown in FIG. 15. As shown in FIG. 15, a phase shift angle is θ, a duty cycle is fixed at 50%, the switching transistors $S_{p1}$ and $S_{p3}$ form a leading bridge arm, the switching transistors $S_{p2}$ and $S_{p4}$ form a lagging bridge arm, and switching transistors on a same bridge arm are complementarily turned on. A turn ratio of each transformer 13a is N1:N2. In this way, an orderly ratio of a coil voltage ($u_p$) to a coil current ($i_p$) at the transmitter end 200a under synchronous modulation may be implemented by adjusting the turn ratio of the transformer 13a, to meet a power requirement of the load side.

It may be understood that, as described above, under modulation of a synchronous phase shift PWM control signal, a quantity of energy management modules 100a of the smallest module may be extended to N (refer to FIG. 14). In this case, a form of a bus parallel input and a decoupling transformer series output is still used, and the control system still maintains synchronous phase shift control. States of switching transistors of inverter circuits 12a in the energy management modules 100a are consistent during dynamic wireless power supply. The following uses the inverter circuit 12a of the smallest module as an example to analyze a time segment-based change of a circuit state of the inverter circuit 12a.

Figure 16A:
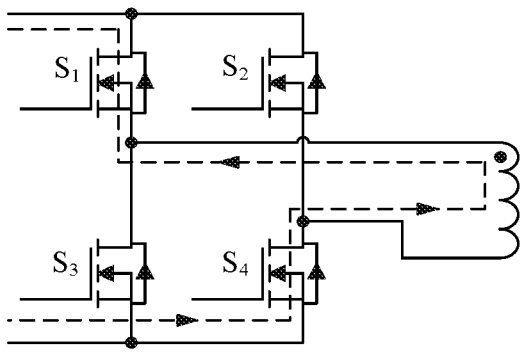
FIGS. 16A-16F are schematic diagrams of single-period working states of one group of switching transistors at the transmitter end shown in FIG. 13.

As shown in FIG. 16A, in a phase $t_0$ to $t_1$, switching transistors $S_1$ and $S_4$ are turned on. In this case, a full-bridge output voltage is positive, and a coil current maintains a reverse backflow state due to circuit resonance, and gradually attenuates.

Figure 16B:
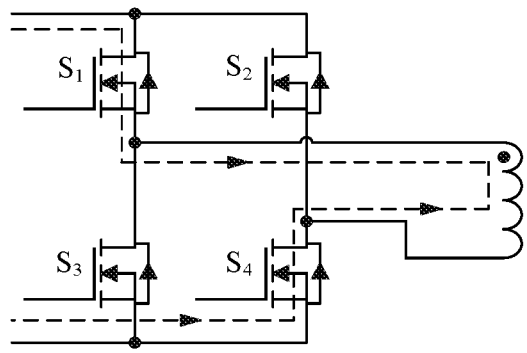

As shown in FIG. 16B, in a phase $t_1$ to $t_2$, the switching transistors $S_1$ and $S_4$ remain on, the voltage maintains a positive power supply voltage, and the coil current is positively conducted after being attenuated to zero, and gradually increases.

Figure 16C:
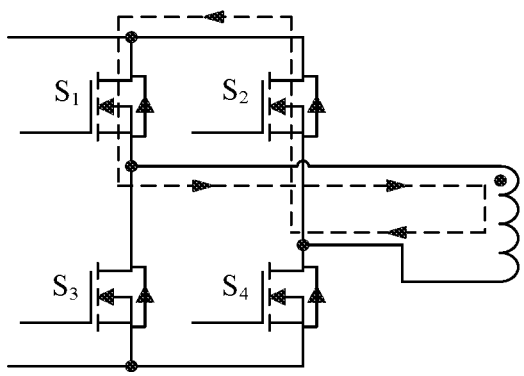

As shown in FIG. 16C, in a phase $t_2$ to $t_3$, the switching transistor $S_4$ is turned off, $S_2$ starts to be turned on, and $S_1$ remains on. In this case, an output voltage is zero, and the coil current continues to increase to a peak value in a loop formed by the switching transistors $S_1$ and $S_2$ and then starts to attenuate.

Figure 16D:
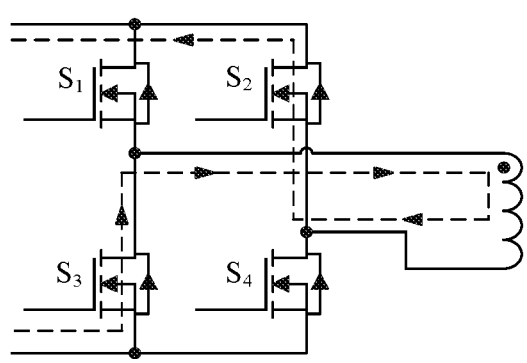

As shown in FIG. 16D, in a phase $t_3$ to $t_4$, the switching transistor $S_1$ is turned off, $S_3$ starts to be turned on, and $S_2$ remains on. In this case, a full bridge outputs a reverse power supply voltage, and the coil current keeps flowing forward in the coil, flows back to the power supply, and gradually attenuates.

Figure 16E:
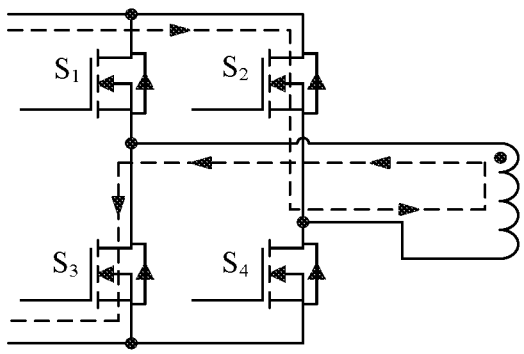

As shown in FIG. 16E, in a phase $t_4$ to t5, the switching transistors S2 and S3 remain on, the power supply supplies power to the coil, the voltage is negative, and the current flows reversely in the coil.

Figure 16F:
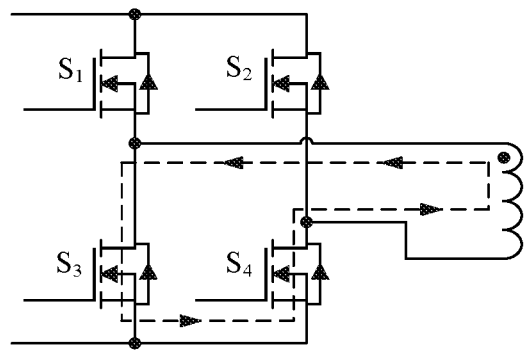

As shown in FIG. 16F, in a phase $t_5$ to $t_6$, the switching transistor $S_2$ is turned off, $S_4$ starts to be turned on, $S_3$ remains on, and the voltage is zero. In this case, the coil current remains reversed, continues to increase to a peak value in a loop formed by $S_3$ and $S_4$, and then starts to attenuate.

Refer to FIG. 14 again. It may be understood that, because the transformers 13a of the two energy management modules 100a of the smallest modules at the transmitter end 200a use an input-parallel and output-series structure, the two energy management modules 100a of the smallest modules share a power requirement required by the load side, to reduce a current stress borne by a switching device (for example, the switching transistors $S_{p1}$ to $S_{p4}$) in the energy management module 100a, and increase an upper threshold of an input current. In addition, a power capacity can be flexibly increased or decreased by adding or removing a minimum power conversion module (that is, the energy management module 100a), to improve fault tolerance. In addition, the two energy management modules 100a are disposed, an independent transformer 13a is disposed for each energy management module 100a, and the independent transformer 13a is connected to the transmitter coil Ct in series. In this way, coupling and separation on an output side can be implemented, a circulating current can be eliminated, power isolation and integration can be implemented, and an overall power capacity of the primary side (the transmitter end 200a) can be effectively improved.

Figure 17:
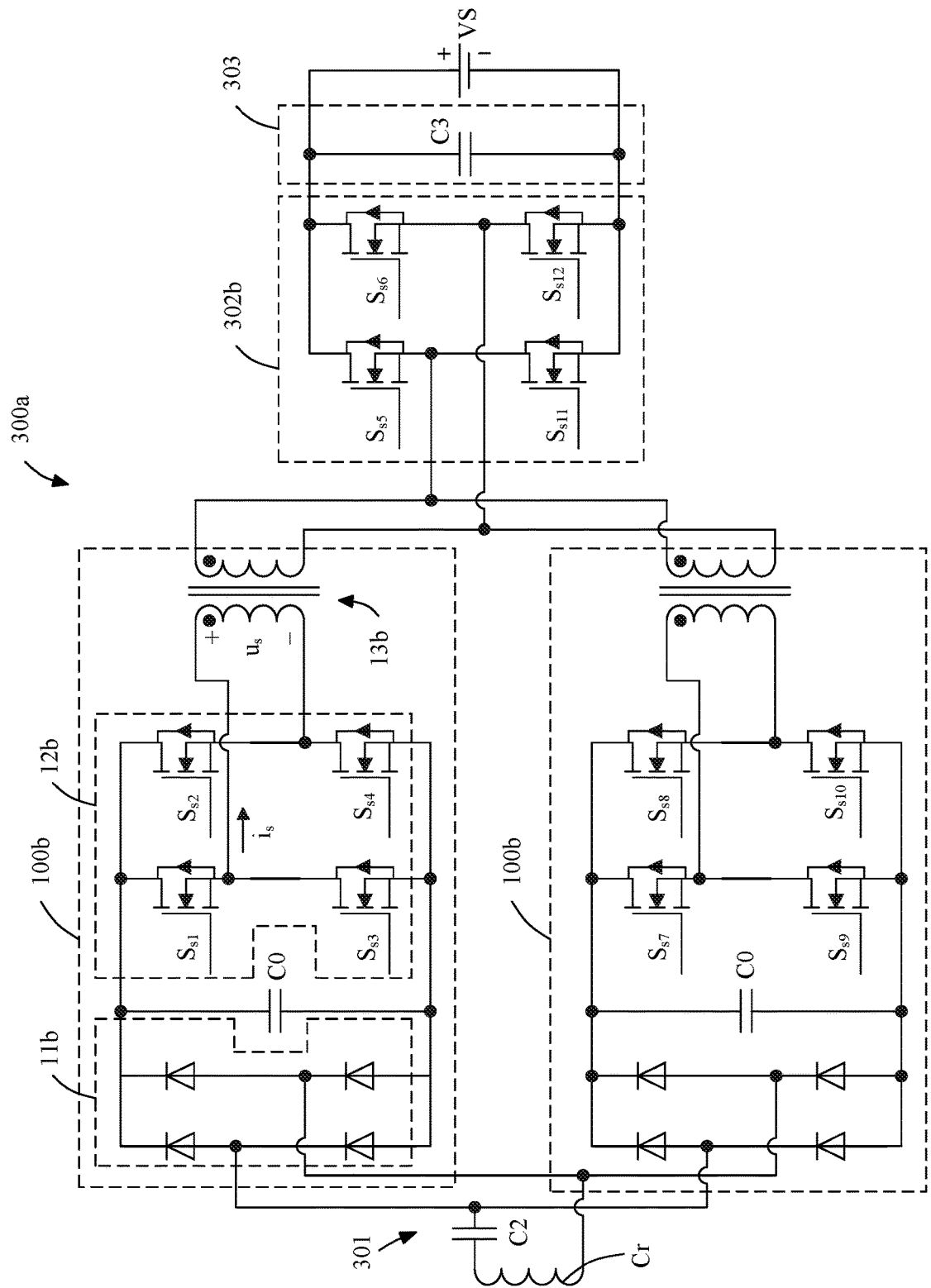
FIG. 17 is a schematic diagram of a circuit of a receiver end in Example 1 of this application.

Refer to FIG. 14 and FIG. 17. FIG. 17 is a schematic circuit diagram of the receiver end 300a in Example 1. The receiver coil Cr transmits electric energy of the transmitter end 200a to the receiver end 300a through magnetic field coupling, and uses the electric energy as a parallel input of the large-capacity energy management module 100b. AC-DC conversion is implemented by using an uncontrolled rectifier circuit (that is, the AC-DC circuit 11b) in the energy management module 100b, and then a direct current is converted into an alternating current with a different amplitude or a different frequency from that of the receiver end through a full-bridge inverter circuit (that is, the inverter circuit 12b) of synchronous phase shift modulation, to implement amplitude modulation or frequency modulation. In addition, energy transferred by the receiver end 300b is output in parallel and aggregated and supplied to the load side through a decoupling transformer structure (that is, the transformer 13b), and then a controlled rectifier (that is, an output rectifier circuit 302b) and the output filter circuit 303 supply power to the load (for example, a battery or a motor). The output rectifier circuit 302b includes switching transistors $S_{s5}$, $S_{s6}$, $S_{s11}$, and $S_{s12}$. Electrical connection relationships between the switching transistors $S_{s5}$, $S_{s6}$, $S_{s11}$, and $S_{s12}$, the corresponding transformer 13b, and the output filter circuit 303 are shown in FIG. 14 and FIG. 17, and details are not described herein again.

Figure 18:
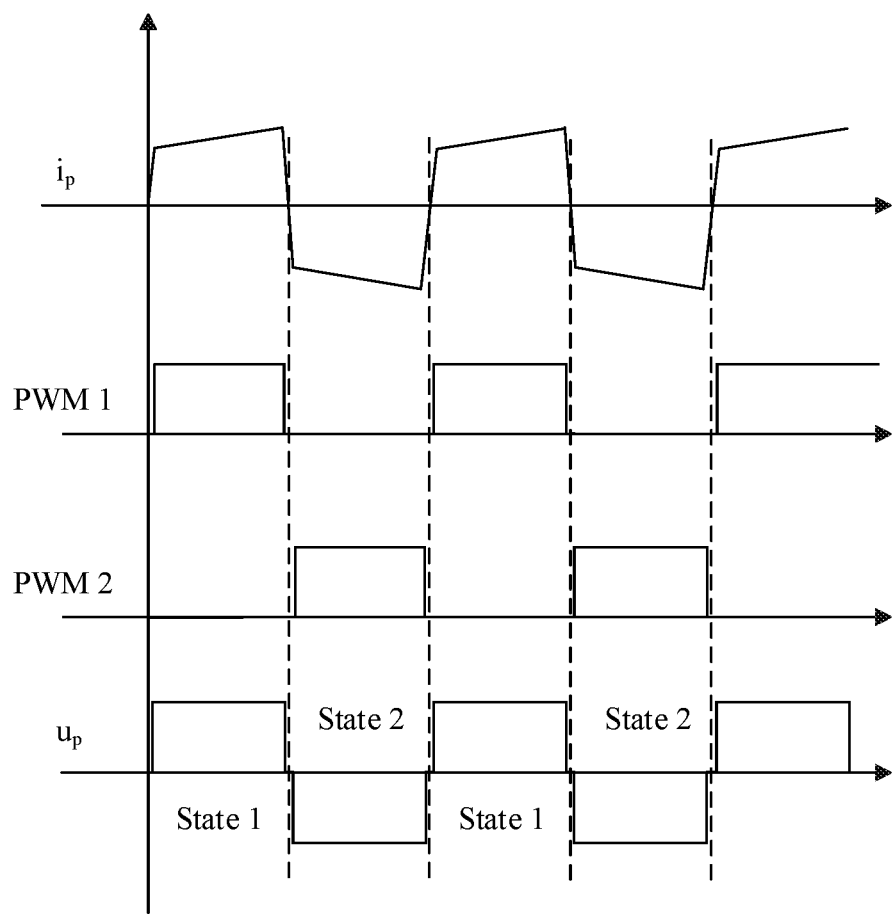
FIG. 18 is a diagram of control signals and a circuit waveform of an energy management module and an output rectifier circuit at the receiver end shown in FIG. 17.

Similar to the transmitter end 200a, the inverter circuit 12b of the receiver end 300a uses synchronous phase shift control, and the control signal and the circuit waveform in the energy management module 100b of the smallest module and the output rectifier circuit 302b are shown in FIG. 18. The switching transistors $S_{s1}$ and $S_{s3}$ form a leading bridge arm, and the switching transistors $S_{s2}$ and $S_{s4}$ form a lagging bridge arm. Switching transistors on a same bridge arm are complementarily turned on. A control signal in a controlled rectifier circuit (that is, the output rectifier circuit 302b) on a secondary side of each energy management module 100b is the same as a control signal in the inverter circuit 12b of the same module. A turn ratio of each transformer 13b is N1:N2. In this way, an orderly ratio of a coil voltage ($u_s$) to a coil current ($i_s$) at the transmitter end under synchronous modulation may be implemented by adjusting the turn ratio of the transformer 13b, to meet a power requirement of the load side.

It may be understood that, as shown in FIG. 14 and FIG. 17, the receiver end 300a includes the two energy management modules 100b of the smallest modules, and the two energy management modules 100b are connected in parallel. Certainly, in another embodiment, a power capacity of the receiver end 300a may be flexibly increased or decreased by increasing or decreasing the quantity of output-parallel energy management modules 100b. In this case, synchronous PWM phase shift control is still performed, and the output current is always a current in a same direction by controlling a time sequence of switching transistors, to charge the load (for example, a battery). In addition, output power control is implemented by using the PWM control signal and the controlled rectifier circuit (that is, the output rectifier circuit 302b) on the parallel output side of the receiver end 300a.

Figure 19A:
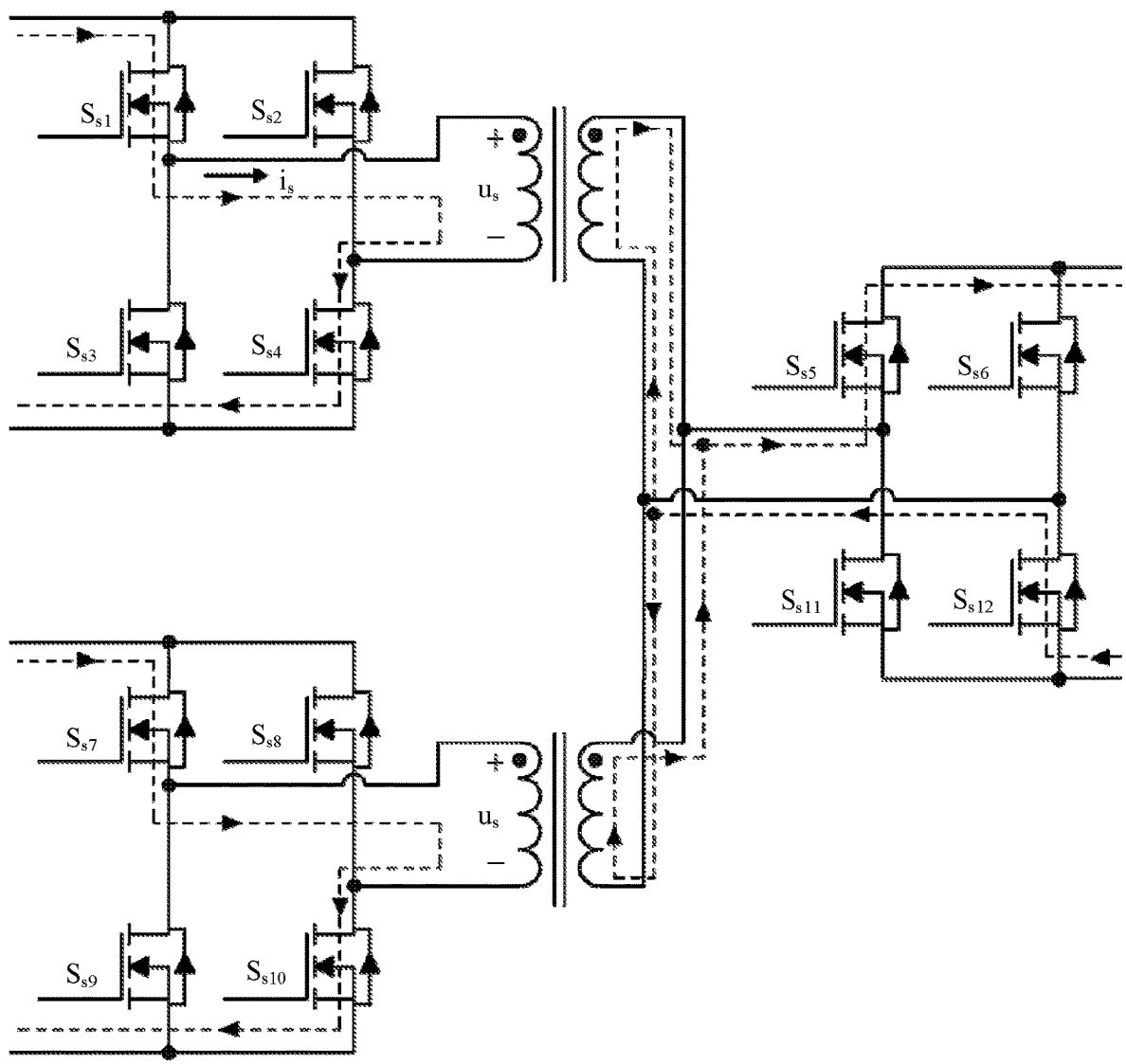
FIG. 19A and FIG. 19B are a schematic diagram of working states of switching transistors of an energy management module and an output rectifier circuit at the receiver end shown in FIG. 17.
Figure 19B:
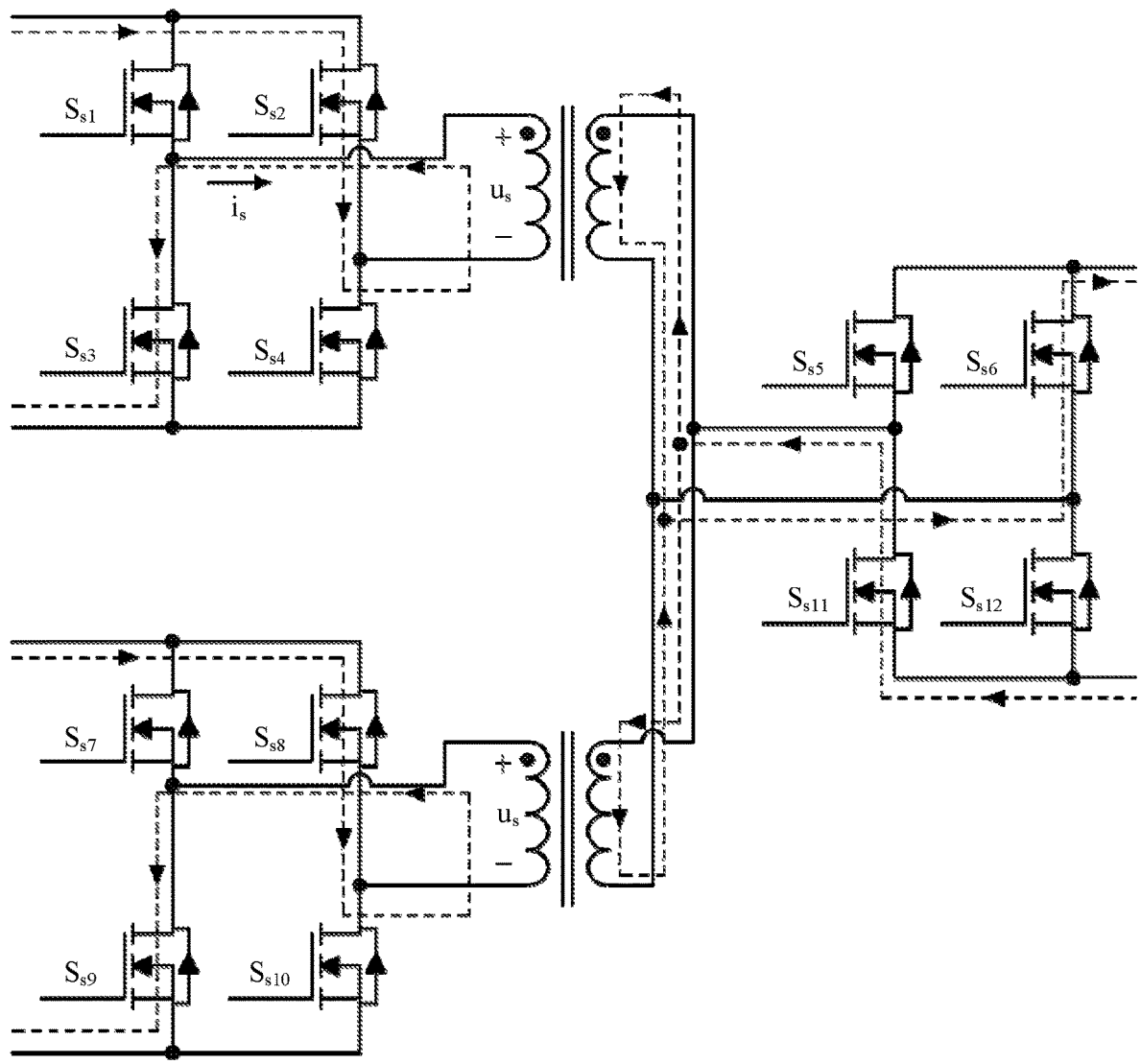

Refer to FIG. 18 and FIG. 19A and FIG. 19B. FIG. 18 is a diagram of control signals and a circuit waveform of the energy management module 100b of the smallest module and the output rectifier circuit 302b. FIG. 19A and FIG. 19B are a schematic diagram of working states of switching transistors (for example, switching transistors $S_{s1}$ to $S_{s12}$) of the energy management module 100b of the smallest module and the output rectifier circuit 301b. As shown in FIG. 18 and FIG. 19A and FIG. 19B, the two output-parallel energy management modules 100b of smallest modules are used as an example. Working states of the switching transistors are analyzed as follows: [1] In a state 1 (State 1 shown in FIG. 18 and FIG. 19A and FIG. 19B), a control signal PWM 1 is at a high level, a control signal PWM 2 is at a low level, switching transistors $S_{s1}$, $S_{s4}$, $S_{s7}$, $S_{s10}$, $S_{s5}$, and $S_{s12}$ are turned on, and switching transistors $S_{s2}$, $S_{s3}$, $S_{s8}$, $S_{s9}$, $S_{s6}$, and $S_{s11}$ are turned off.

[2] In a state 2 (State 2 shown in FIG. 18 and FIG. 19A and FIG. 19B), the control signal PWM 1 is at a low level, the control signal PWM 2 is at a high level, the switching transistors $S_{s2}$, $S_{s3}$, $S_{s8}$, $S_{s9}$, $S_{s6}$, and $S_{s11}$ are turned on, and the switching transistors $S_{s1}$, $S_{s4}$, $S_{s7}$, $S_{s10}$, $S_{s5}$, and $S_{s12}$ are turned off.

It may be understood that, as described above, in Example 1, synchronous frequency conversion and voltage regulation power transmission of dynamic wireless power supply is implemented by using the output-parallel full-bridge inverter circuit (that is, the inverter circuit 12b) of synchronous phase shifting modulation at the receiver end 300a, and the plurality of minimum power modules (that is, the energy management module 100b) can flexibly implement power expansion on the secondary side. Energy transferred by the plurality of receiver ends is aggregated and supplied to the load side through the decoupling transformer structure (that is, the transformer 13b). By designing and adjusting a turn ratio of the transformer 13b, electric energy can be transferred on the load side at a ratio, to improve an output capability.

It may be understood that in Example 1, a group of typical circuit parameters provided in this embodiment of this application are as follows: If the primary side (that is, the transmitter end 200a) uses five minimum power modules (that is, five energy management modules 100a) for serial output, and a transformer turn ratio is 5:1, a structure combination of compensation topologies of the primary side and the secondary side forms an S-S type, and a fluctuation range of a coupling coefficient between a guide rail and the receiver coil Cr is about 0.05 to 0.15. A voltage range of a vehicle-mounted direct current bus of an electric vehicle as a load is about 400 V to 600 V. When the primary side is connected to a three-phase alternating current power grid, a direct current voltage output by a rectifier is approximately 540 V, and a maximum average input current of the minimum power module of the transmitter end 200a that operates during dynamic charging is approximately 40 A. In this case, the single smallest module (that is, the energy management module 100a) may transmit a charging power of about 20 kilowatt (kW), and may provide energy transmission of a 200 A constant current and a 100 kW power capacity of an inverter source (for example, the inverter circuit 12a).

It may be understood that, when the turn ratios of the transformers 13a and 13b are set, voltage and current parameter requirements of the upstream and the downstream generally need to be considered. For example, at the transmitter end 200a, conversion from a high-voltage small current to a low-voltage large current needs to be implemented. In this case, the turn ratio of the transformer 13a in the smallest module on the primary side may be set to N1:N2>1. In this case, a coil current is increased by using a turn ratio design. In addition, a coil voltage is increased by using an output-series manner, to implement overall power expansion of the transmitter end 200a. For another example, when a turn ratio design of the transformer 13b at the receiver end 300a is considered, parameters of the secondary-side output circuit need to be comprehensively considered. If a secondary-side output voltage is insufficient in a low coupling state, to meet a load voltage requirement, the turn ratio may be adjusted to N1:N2<1.

EXAMPLE 2

Figure 20:
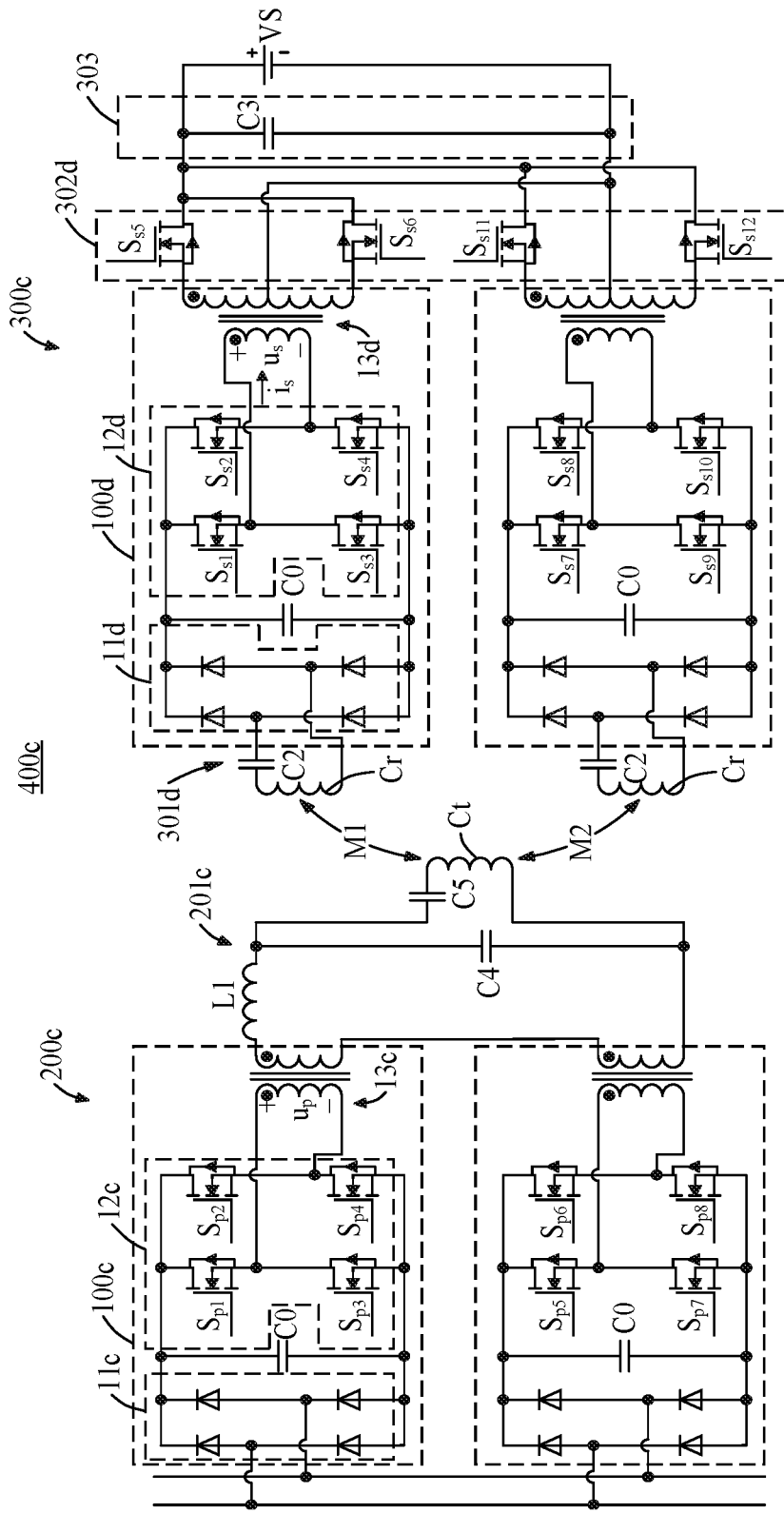
FIG. 20 is a schematic diagram of a circuit of using an energy management module to a dynamic wireless power supply system according to Example 2 of this application.

FIG. 20 is a schematic diagram of a circuit of using a large-capacity energy management module in a dynamic wireless power supply system 400c in Example 2. In Example 2, both a transmitter end and a receiver end include a plurality of energy management modules of smallest modules. For example, as shown in FIG. 20, a transmitter end 200c includes two energy management modules 100c. A receiver end 300c includes two energy management modules 100d. Each energy management module 100c or 100d includes an uncontrolled rectifier (that is, an AC-DC circuit 11c or 11d), an inverter circuit 12c or 12d, and a transformer 13c or 13d.

It may be understood that, in Example 2, a circuit structure of the energy management module 100c at the transmitter end 200c is the same as or similar to that of the energy management module 100a at the transmitter end 200a in Example 1. For details, refer to descriptions about the energy management module 100a at the transmitter end 200a. Details are not described herein again. Similarly, a circuit structure of the energy management module 100d at the receiver end 300c is the same as or similar to that of the energy management module 100b at the receiver end 300a. For details, refer to descriptions about the energy management module 100b at the receiver end 300a. Details are not described herein again.

It may be understood that, a difference between the dynamic wireless power supply system 400c in Example 2 and the dynamic wireless power supply system 400a in Example 1 lies in that a circuit structure of a compensation network 201c at the transmitter end 200c is different from a circuit structure of the compensation network 201 in Example 1. In addition, a magnetic coupling mechanism in Example 2 is a magnetic coupling mechanism with a single transmitter end to a plurality of receiver ends. To be specific, one transmitter coil Ct corresponds to a plurality of receiver coils Cr (for example, as shown in FIG. 20, two receiver coils Cr), to further form a plurality of magnetic coupling mechanisms, for example, magnetic coupling mechanisms M1 and M2. In addition, in Example 2, a connection relationship between an output rectifier circuit 302d and a corresponding transformer 13d is different from a connection relationship between the output rectifier circuit 302b and the corresponding transformer 13b in Example 1.

Specifically, in Example 2, the compensation network 201c includes an inductor L1 and two third compensation capacitors C4 and C5. The inductor L1 and the third compensation capacitor C4 are connected in series to two ends of secondary coils of the series-connected transformers 13c. One end of the third compensation capacitor C5 is connected to the transmitter coil Ct in series, and the other end is connected between the inductor L1 and the third compensation capacitor C4. The other end of the transmitter coil Ct is connected to the other end of the third compensation capacitor C4. In this way, the inductor L1 and the two third compensation capacitors C4 and C5 form an LCC compensation network. The compensation network 301d at the receiver end 300c is an S compensation network. Therefore, a structure combination of the compensation network 201c at the transmitter end 200c and the compensation network 301d at the receiver end 300c forms an LCC-S type. Similarly, in another embodiment, in addition to the LCC-S type, the structure combination of the compensation network 201c at the transmitter end 200c and the compensation network 301d at the receiver end 300c may alternatively form a P-P type, an S-P type, a P-S type, an LCL-LCL type, an LCL-P type, an LCC-LCC type, or the like. This is not specifically limited in this embodiment of this application.

In Example 2, a source of a switching transistor $S_{s5}$ and a source of the switching transistor $S_{s6}$ in the output rectifier circuit 302d are electrically connected to two ends of the secondary coil of the corresponding transformer 13d. A drain of the switching transistor $S_{s5}$ and the drain of the switching transistor $S_{s6}$ are connected together, and are electrically connected to a drain of a switching transistor $S_{s11}$ and a drain of a switching transistor $S_{s12}$. A source of the switching transistor $S_{s11}$ and a source of the switching transistor $S_{s12}$ are electrically connected to two ends of the secondary coil of the corresponding transformer 13d. One end of a filter capacitor C3 of the output filter circuit 303 is electrically connected to the drain of the switching transistor $S_{s5}$, and the other end is electrically connected between secondary coils of the two transformers 13d.

It may be understood that the dynamic wireless power supply system 400c in Example 2 may be applicable to a magnetic coupling mechanism in which magnetic field strength (for example, a traveling wave magnetic field) can uniformly or periodically change in a traveling direction at a location of a receiver end. For a magnetic coupling mechanism with uniform magnetic field strength, an output of a receiver end has a characteristic of a constant voltage source with a consistent output voltage. For a magnetic coupling mechanism with a periodically changing magnetic field in a traveling direction, an output of a receiver end has a characteristic of a periodically changing voltage source. In this case, an induced voltage output by the magnetic coupling mechanism is generally determined by a mechanical structure of the magnetic coupling mechanism and is fixed on N (N≥1, N∈Z) periods, and a voltage of the voltage source of the magnetic coupling mechanism is also consistent. Therefore, a receiver end module does not need to perform adjustment for input voltage consistency. Even if a slight deviation is caused by an installation deviation, device aging, or the like, synchronous adjustment may be performed by using a secondary-side controller (for example, a receiver end control system).

It may be understood that, as shown in FIG. 20, the energy management module 100c of the transmitter end 200c uses a parallel input end on a power grid bus side, and a high-frequency alternating current of the transmitter coil Ct is provided by output-series decoupling transformers, to improve a primary-side power capacity. The compensation network 201c and the compensation network 301d use an LCC-S compensation topology, to implement constant-voltage and constant-current power output and have a good no-load characteristic. The secondary side (that is, the receiver end 300c) is still formed by the output-parallel energy management modules 100c of the minimum power modules, and the plurality of receiver coils Cr implement a power requirement of a high-power load by using the output-parallel smallest modules.

It may be understood that each energy management module 100c or 100d on the primary side or the secondary side includes the inverter circuit 12c or 12d, and control manners of the inverter circuits 12c and 12d are phase shift control. In addition, as the energy management modules 100c and 100d of the expandable capacity, the control systems of the energy management modules 100c and 100d are consistent on the same side. For example, on the primary side, the groups of inverter circuits 12c use a same control system, and an operating frequency of each group of inverter circuits 12c matches a resonance frequency. For another example, on the secondary side, the groups of output-parallel inverter circuits 12d also use a same control system, to ensure stability and controllability of an output voltage and an output current.

It may be understood that the overall circuit working state of the dynamic wireless power supply system 400c is similar to the overall circuit working state of the dynamic wireless power supply system 400a in Example 1. A difference lies in that the receiver end 300c on the secondary side uses a structure of two groups of output-parallel controlled rectifier circuits (that is, the output rectifier circuits 302d). Therefore, for a part of the transmitter end 200c, refer to related descriptions of the transmitter end 200a. Details are not described herein again. The following analyzes only the working state of the secondary side in Example 2.

Figure 21:
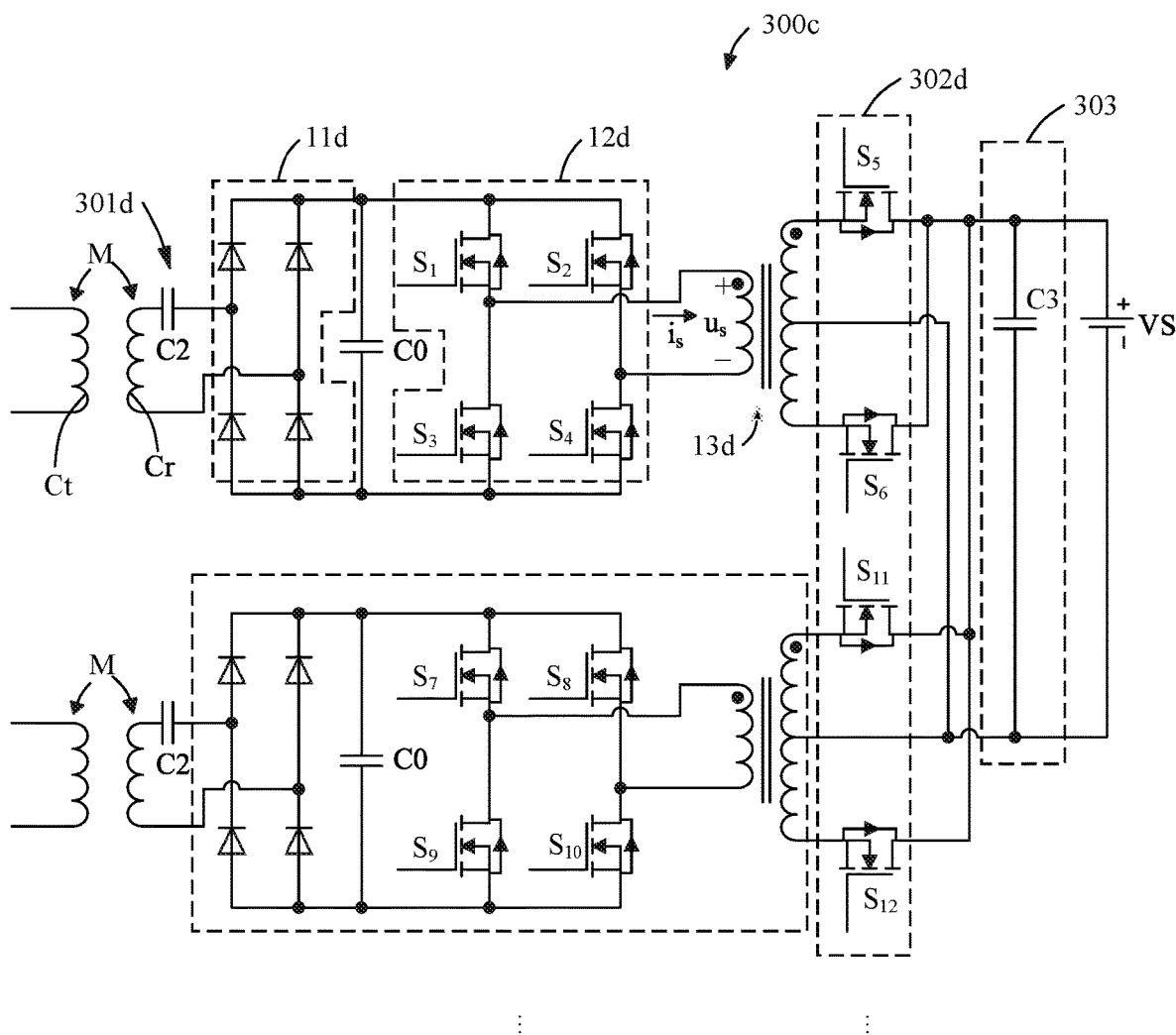
FIG. 21 is a schematic diagram of a circuit of a receiver end including a plurality of energy management modules in Example 2 of this application.
Figure 22:
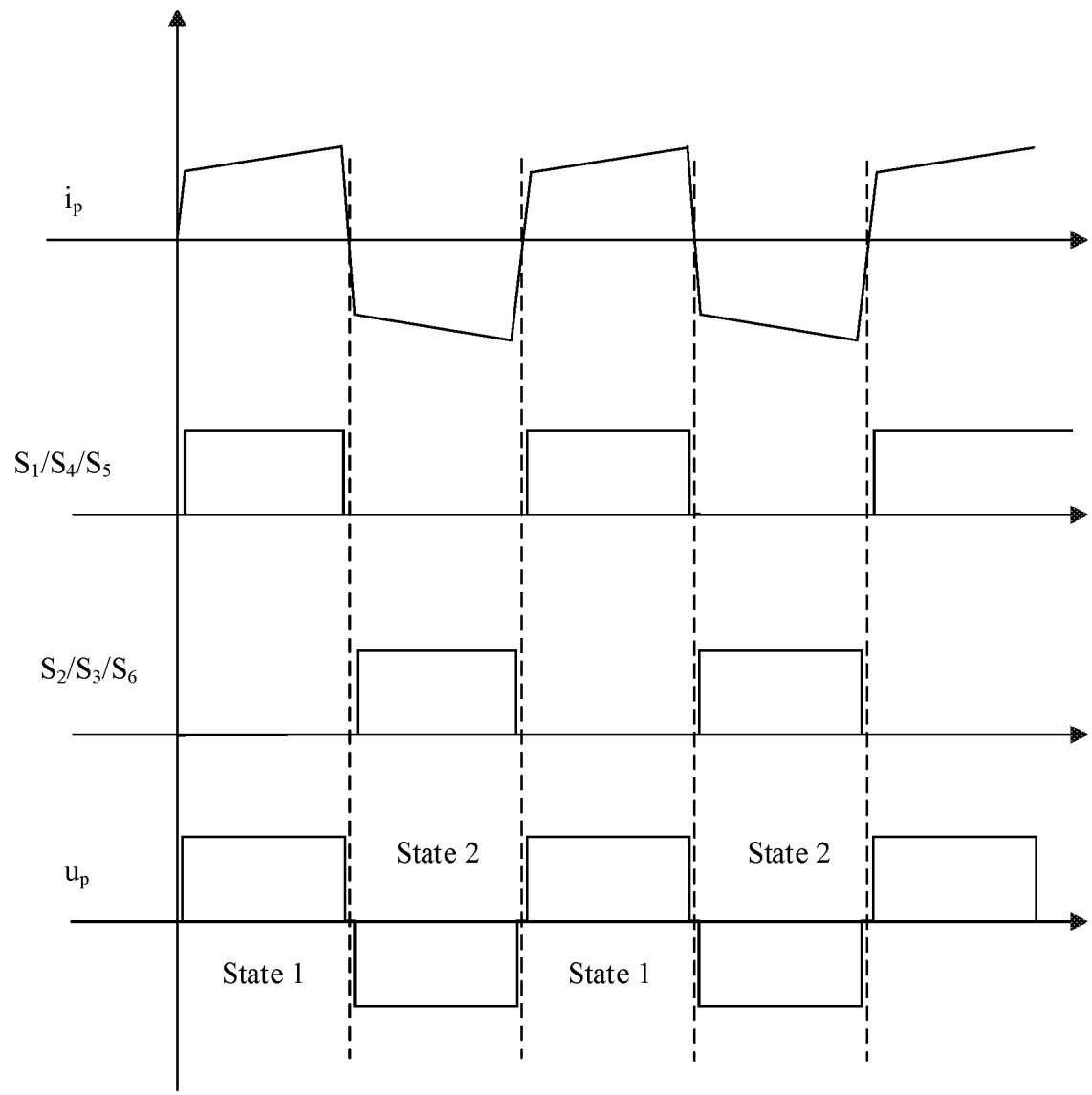
FIG. 22 is a schematic diagram of PWM control signals and a circuit waveform of an energy management module and an output rectifier circuit at a receiver end in Example 2.
Figure 23A:
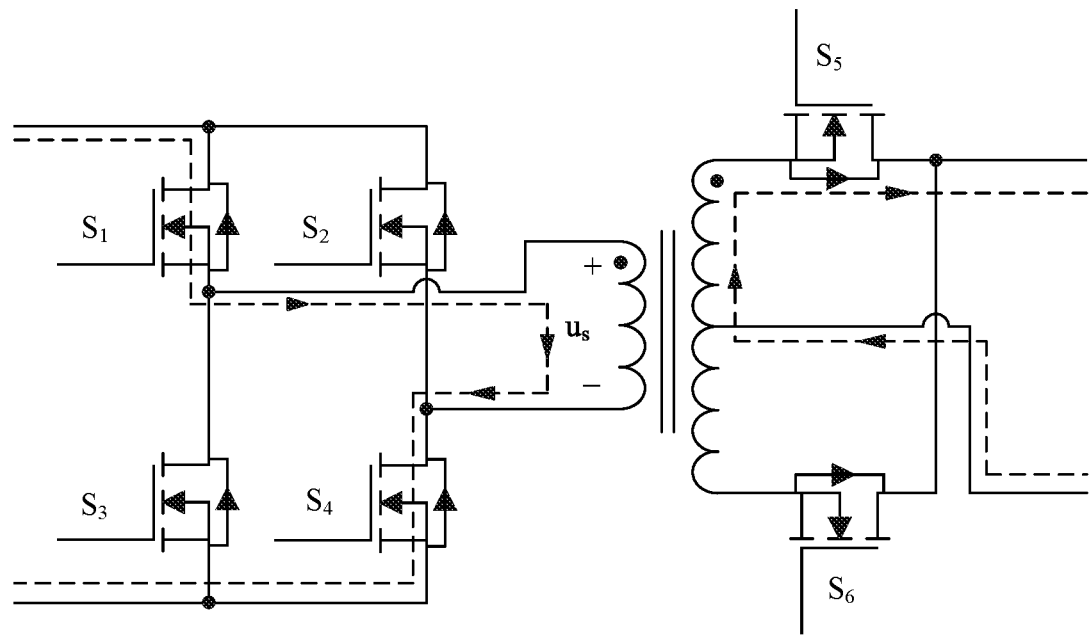
FIG. 23A and FIG. 23B are schematic diagrams of working states of switching transistors of an energy management module and an output rectifier circuit at a receiver end in Example 2.
Figure 23B:
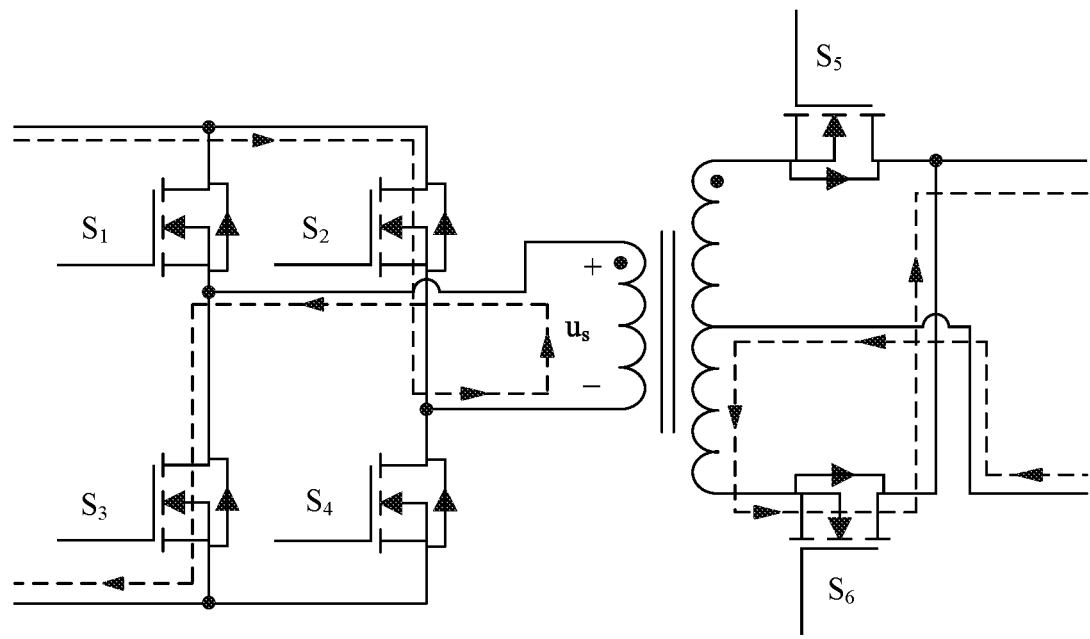

Refer to FIG. 21, FIG. 22, and FIGS. 23A-23B together. FIG. 21 is a schematic diagram of a circuit of the receiver end 300c including a plurality of energy management modules 100d in Example 2. FIG. 22 is a schematic diagram of PWM control signals and a circuit waveform of the energy management module 100d of the smallest module and the output rectifier circuit 302d at the receiver end 300c in Example 2. FIGS. 23A-23B are schematic diagrams of working states of switching transistors (for example, switching transistors $S_1$ to $S_{12}$) of the energy management module 100d of the smallest module and the output rectifier circuit 302d at the receiver end 300c. Synchronous phase shift control is still used on the secondary side. A working state of the smallest module is shown in FIGS. 23A-23B. Output-parallel working states of the two receiver coils Cr are analyzed as follows:

[1] In a state 1 (State 1 shown in FIG. 22 and FIGS. 23A-23B), a control signal PWM 1 is at a high level, a control signal PWM 2 is at a low level, the switching transistors $S_1$, $S_4$, $S_7$, $S_{10}$, $S_5$, and $S_{11}$ are turned on, and the switching transistors $S_2$, $S_3$, $S_8$, $S_9$, $S_6$, and $S_{12}$ are turned off.

[2] In a state 2 (State 2 shown in FIG. 22 and FIGS. 23A-23B), the control signal PWM 1 is at a low level, the control signal PWM 2 is at a high level, the switching transistors $S_2$, $S_3$, $S_8$, $S_9$, $S_6$, and $S_{12}$ are turned on, and the switching transistors $S_1$, $S_4$, $S_7$, $S_{10}$, $S_5$, and $S_{11}$ are turned off.

In Example 2, synchronous modulation of a combination of a plurality of minimum power modules at the receiver end 300c (that is, a plurality of energy management modules 100d at the receiver end 300c) can effectively suppress voltage fluctuation caused by a location change or the like of different receiver coils in a dynamic magnetic coupling process. The plurality of receiver coils Cr can output more secondary-side power under a low current and voltage stress of a resonant cavity, to improve a power supply capability of the load side.

In conclusion, embodiments of this application mainly relate to a circuit design of a dynamic wireless power supply system of a removable device, an energy management circuit topology and a control method of a large-capacity dynamic wireless power supply system, and an energy management circuit and a control method of a smallest module. The circuit design of the dynamic wireless power supply system proposed in this application can resolve a problem of fast construction and effective control in solutions of different power requirement levels in a wireless power supply system of an existing removable device. The energy management circuit topology and the control method of the large-capacity dynamic wireless power supply system can resolve a problem of a power capacity limitation of an inverter source and an energy management circuit of a receiver end caused by frequency and capacity cross of a power electronic device. In addition, the energy management circuit and the control method of the smallest module can resolve problems of low efficiency, slow resonance state tracking, and poor robustness of the existing dynamic wireless power supply system. In other words, this application can resolve at least three main problems: flexibly adjusting and controlling a power parameter, increasing a power capacity, and designing module decoupling, and finally output a series-parallel circuit topology that can flexibly increase a power capacity of the dynamic wireless power supply system.

It may be understood that the modular energy management module provided in this application includes an AC-DC-AC conversion circuit and a decoupling high-frequency transformer. The AC-DC-AC conversion circuit includes an AC-DC part and a full-bridge inverter part. Certainly, a circuit for implementing AC-DC conversion includes, but is not limited to, an uncontrolled rectifier circuit, and a topology of another circuit that can implement the function complies with a design idea of this application.

It may be understood that the module (that is, the energy management module) provided in this application may work independently, or a plurality of modules may work simultaneously. In this case, all inverter circuits in the module use synchronous phase shift control. Each transformer is decoupled separately, and a turn ratio of the transformer is N1:N2. In addition, an orderly ratio of a coil voltage to a coil current at a transmitter end under synchronous modulation may be implemented by designing and adjusting the turn ratio, to meet a specific power requirement of the load side.

It may be understood that a structure combination of the compensation topologies proposed in this application is not limited to the S-S type and the LCC-S type resonance compensation topologies in this embodiment. That is, there may also be another circuit topology that can implement resonance compensation, such as an S-P type, a P-S type, a P-P type, or an LCC-LCC type.

It may be understood that, at the receiver end provided in this application, the secondary side (that is, the output rectifier circuit) of the decoupling transformer of the receiver end may be a controlled rectifier, or may be another AC-DC conversion circuit. During controlled rectification, a control signal may be synchronized with or may not be synchronized with an inverter circuit control signal in a module (that is, an energy management module).

It may be understood that, at the receiver end provided in this application, when a plurality of modules (that is, energy management modules) work together, input sides of the modules may be each correspondingly connected to a separate receiver end coil (for example, as shown in Example 2), or may be connected to one receiver end coil in series or in parallel (for example, as shown in Example 1). All the foregoing working conditions comply with the design of this application.

It may be understood that, based on the receiver end of the dynamic wireless power supply system provided in the foregoing embodiments, an embodiment of this application further provides an electric vehicle having a dynamic wireless charging function. The following provides specific descriptions with reference to the accompanying drawings.

Figure 24:
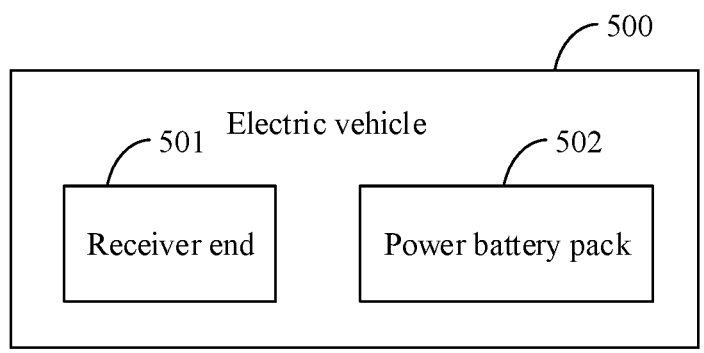
FIG. 24 is a schematic diagram of a structure of an electric vehicle according to an embodiment of this application.

FIG. 24 is a schematic diagram of a structure of an electric vehicle according to an embodiment of this application. An electric vehicle 500 includes a wireless charging receiver end 501 and a power battery pack 502. The wireless charging receiver end 501 is configured to charge the power battery pack 502 of the electric vehicle 500. For an implementation and a working principle of the wireless charging receiver end 501, refer to related descriptions of the receiver end in the foregoing embodiments. Details are not described herein again in this embodiment of this application.

The power battery pack 502 is configured to electrically connect to the receiver end 501, to perform charging by using electric energy from the receiver end 501, and is also configured to supply electric energy to the electric vehicle 500.

It should be understood that the implementations of this application may be randomly combined. For example, the implementations may be used separately, or may be used in combination with each other, to implement different technical effects. This is not limited.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wireless transmitter end comprising:
   a transmitter coil;
   N energy management circuits, wherein N is an integer greater than 1, and wherein each of the N energy management circuits comprises:
     an input end configured to electrically connect to a power grid;
     an output end electrically connected to the transmitter coil;
     an inverter circuit;
     an alternating current-direct current (AC-DC) circuit comprising:
       an AC-DC input end configured to electrically connect to the power grid; and
       an AC-DC output end electrically connected to the inverter circuit; and
     a transformer comprising:
       a primary coil electrically connected to the inverter circuit; and
       a secondary coil electrically connected to the transmitter coil; and
   a transmitter end control system electrically connected to the inverter circuit of each of the N energy management circuits, wherein the transmitter end control system is configured to output synchronous phase shift control signals with a fixed duty cycle in order to drive the inverter circuit of each of the N energy management circuits to work synchronously, wherein the transmitter end control system comprises:
a current sensor electrically connected to the transmitter coil;
a sampling circuit electrically connected to the current sensor;
a controller electrically connected to the sampling circuit and configured to provide a drive signal; and
a drive circuit electrically connected to the controller, wherein the drive circuit is configured to:
receive the drive signal from the controller; and
output a corresponding phase shift control signal to the inverter circuit of each of the N energy management circuits.

2. The wireless transmitter end of claim 1, wherein the N energy management circuits are electrically connected in parallel to each other.

3. The wireless transmitter end of claim 1, wherein the inverter circuit comprises switching transistors forming a full-bridge inverter circuit, wherein the AC-DC circuit is an uncontrolled rectifier circuit, and wherein the switching transistors are configured to receive the phase shift control signals.

4. The wireless transmitter end of claim 1, further comprising a compensation network electrically connected between the output end of each of the N energy management circuits and the transmitter coil.

5. The wireless transmitter end of claim 1, wherein the controller is configured to:
receive a current signal from the sampling circuit;
determine, based on the current signal, whether overcurrent occurs in the current signal;
generate, when the overcurrent occurs, an interrupt signal for outputting to the drive circuit to block a drive circuit output; and
generate, when no overcurrent occurs, the drive signal for outputting to the drive circuit.

6. The wireless transmitter end of claim 5, wherein the controller is configured to control each of the N energy management circuits to provide an equal current.

7. The wireless transmitter end of claim 1, wherein the transformer is a high-frequency transformer with a variable turn ratio.

8. The wireless transmitter end of claim 1, wherein the N energy management circuits are electrically connected in series to each other.

9. A wireless receiver end comprising:
a receiver coil;
M energy management circuits, wherein M is an integer greater than 1, and wherein each of the M energy management circuits comprises:
an input end electrically connected to the receiver coil;
an output end configured to electrically connect to a load;
an inverter circuit;
an alternating current-direct current (AC-DC) circuit comprising:
an AC-DC input end electrically connected to the receiver coil; and
an AC-DC output end electrically connected to the inverter circuit; and
a transformer comprising:
a primary coil electrically connected to the inverter circuit; and
a secondary coil configured to electrically connect to the load; and a receiver end control system electrically connected to the inverter circuit of each of the M energy management circuits,
wherein the receiver end control system is configured to output synchronous phase shift control signals with a fixed duty cycle in order to drive the inverter circuit of each of the M energy management circuits to work synchronously, wherein the receiver end control system comprises:
a current sensor electrically connected to the load;
a voltage sensor electrically connected to the load;
a sampling circuit electrically connected to the current sensor and the voltage sensor;
a controller electrically connected to the sampling circuit; and
a drive circuit electrically connected to the controller, and wherein the drive circuit is configured to:
receive a drive signal; and
output, to the inverter circuit, the phase shift control signals.

10. The wireless receiver end of claim 9, wherein the M energy management circuits are electrically connected in series or in parallel to each other.

11. The wireless receiver end of claim 9, wherein the inverter circuit comprises switching transistors forming a full-bridge inverter circuit, wherein the AC-DC circuit is an uncontrolled rectifier circuit, and wherein the switching transistors are configured to receive the phase shift control signals.

12. The wireless receiver end of claim 9, further comprising a compensation network electrically connected between the receiver coil and each of the M energy management circuits.

13. The wireless receiver end of claim 9, further comprising:
an output filter circuit; and
an output rectifier circuit comprising:
a first end electrically connected to the output end of each of the M energy management circuits; and
a second end configured to electrically connect to the load through the output filter output, wherein the drive circuit is further configured to output the phase shift control signals to the output rectifier circuit.

14. The wireless receiver end of claim 9, wherein the controller is further configured to:
receive a circuit signal from the sampling circuit;
determine, based on the circuit signal, whether overcurrent or overvoltage occurs in the circuit signal, wherein the circuit signal comprises a current signal and a voltage signal;
generate, when the overcurrent or overvoltage occurs, an interrupt signal for outputting to the drive circuit to block a drive circuit output; and
generate, when the controller determines that no overcurrent or overvoltage occurs, the drive signal for outputting the drive signal to the drive circuit.

15. A dynamic wireless power supply system comprising:
a wireless transmitter end comprising:
a transmitter coil;
N energy management circuits, wherein N is an integer greater than 1, and wherein each of the N energy management circuits comprises:
a first input end configured to electrically connect to a power grid;
a first output end electrically connected to the transmitter coil;
a first inverter circuit;

a first alternating current-direct current (AC-DC) circuit comprising:
   a first AC-DC input end configured to electrically connect to the power grid; and
   a first AC-DC output end electrically connected to the first inverter circuit; and
a first transformer comprising:
   a first primary coil electrically connected to the first inverter circuit; and
   a first secondary coil electrically connected to the transmitter coil; and
a transmitter end control system electrically connected to the first inverter circuit of each of the N energy management circuits, wherein the transmitter end control system is configured to output synchronous first phase shift control signals with a first fixed duty cycle in order to drive the first inverter circuit of each of the N energy management circuits to work synchronously wherein the transmitter end control system comprises:
   a first current sensor electrically connected to the transmitter coil;
   a first sampling circuit electrically connected to the first current sensor;
   a first controller electrically connected to the first sampling circuit; and
   a first drive circuit electrically connected to the first controller, wherein the first drive circuit is configured to:
      receive a first drive signal from the first controller; and
      output a corresponding phase shift control signal to the first inverter circuit of each of the N energy management circuits; and
a wireless receiver end comprising:
   a receiver coil;
   M energy management circuits, wherein M is an integer greater than 1, and wherein each of the M energy management circuits comprises:
      a second input end electrically connected to the receiver coil;
      a second output end configured to electrically connect to a load;
      a second inverter circuit;
      a second AC-DC circuit comprising:
         a second AC-DC input end electrically connected to the receiver coil; and
         a second AC-DC output end electrically connected to the second inverter circuit; and
      a second transformer comprising:
         a second primary coil electrically connected to the second inverter circuit; and
         a second secondary coil configured to electrically connect to the load; and
   a receiver end control system electrically connected to the second inverter circuit of each of the M energy management circuits,
wherein the receiver end control system is configured to output synchronous second phase shift control signals with a second fixed duty cycle in order to drive the second inverter circuit of each of the M energy management circuits to work synchronously, wherein the receiver end control system comprises:
   a second current sensor electrically connected to the load;
   a second voltage sensor electrically connected to the load;
   a second sampling circuit electrically connected to the second current sensor and the second voltage sensor;
   a second controller electrically connected to the second sampling circuit; and
   a second drive circuit electrically connected to the second controller, and wherein the second drive circuit is configured to:
      receive a second drive signal; and
      output, to the second inverter circuit, the second phase shift control signals.

16. The dynamic wireless power supply system of claim 15, further comprising a compensation network electrically connected between the first output end of each of the N energy management circuits and the transmitter coil.

17. The dynamic wireless power supply system of claim 16, wherein the compensation network comprises:
   a first inductor comprising:
      a first inductor end electrically connected to the first secondary coil of a first energy management circuit of the N energy management circuits; and
      a second inductor end;
   a first capacitor comprising:
      a first capacitor end electrically connected to the second inductor end; and
      a second capacitor end electrically connected to the first secondary coil of a second energy management circuit of the N energy management circuits;
   a second capacitor comprising:
      a third capacitor end electrically connected to the second inductor end; and
      a fourth capacitor end electrically connected to the transmitter coil.

18. The dynamic wireless power supply system of claim 15, wherein the first controller is configured to:
   receive a first current signal from the first sampling circuit;
   determine, based on the first current signal, whether overcurrent occurs in the first current signal;
   generate, when the overcurrent occurs, a first interrupt signal for outputting to the first drive circuit to block a first drive circuit output; and
   generate, when no overcurrent occurs, the first drive signal for outputting to the first drive circuit, and
wherein the second controller is configured to:
   receive a second current signal from the second sampling circuit;
   determine, based on the second current signal, whether overcurrent occurs in the second current signal;
   generate, when the overcurrent occurs, a second interrupt signal for outputting to the second drive circuit to block a second drive circuit output; and
   generate, when no overcurrent occurs, the second drive signal for outputting to the second drive circuit.

19. The dynamic wireless power supply system of claim 15, further comprising:
   an output filter circuit; and
   an output rectifier circuit comprising:
      a first end electrically connected to the second output end of each of the M energy management circuits; and
      a second end configured to electrically connect to the load through the output filter output, wherein the second drive circuit is further configured to output the second phase shift control signals to the output rectifier circuit.

20. The dynamic wireless power supply system of claim 15, wherein the M energy management circuits are electrically connected in series or in parallel to each other.

* * * * *